(12) United States Patent
Pitcher et al.

(10) Patent No.: US 8,370,283 B2
(45) Date of Patent: Feb. 5, 2013

(54) PREDICTING ENERGY CONSUMPTION

(75) Inventors: John Pitcher, Marietta, GA (US);
Matthew Hortman, Suwanee, GA (US)

(73) Assignee: Scienergy, Inc., San Francisco, CA (US)

( * ) Notice: Subject to any disclaimer, the term of this patent is extended or adjusted under 35 U.S.C. 154(b) by 0 days.

(21) Appl. No.: 13/185,421

(22) Filed: Jul. 18, 2011

(65) Prior Publication Data

US 2011/0276527 A1 Nov. 10, 2011

Related U.S. Application Data

(60) Provisional application No. 61/423,482, filed on Dec. 15, 2010.

(51) Int. Cl.
| | |
|---|---|
| G06E 1/00 | (2006.01) |
| G06E 3/00 | (2006.01) |
| G06F 15/18 | (2006.01) |
| G06F 7/60 | (2006.01) |
| G06F 17/10 | (2006.01) |
| G06G 7/00 | (2006.01) |

(52) U.S. Cl. .................. 706/21; 706/16; 706/19; 703/2
(58) Field of Classification Search ..................... None
See application file for complete search history.

(56) References Cited

U.S. PATENT DOCUMENTS

| | | | | |
|---|---|---|---|---|
| 6,577,962 | B1 * | 6/2003 | Afshari .......................... | 702/61 |
| 6,785,592 | B1 | 8/2004 | Smith et al. | |
| 7,216,021 | B2 * | 5/2007 | Matsubara et al. .......... | 700/295 |
| 7,519,485 | B2 | 4/2009 | MacGregor | |
| 7,552,100 | B2 * | 6/2009 | Chen .............................. | 706/21 |
| 7,584,165 | B2 | 9/2009 | Buchan | |
| 7,818,270 | B2 * | 10/2010 | Carey et al. .................... | 705/412 |
| 7,881,889 | B2 * | 2/2011 | Barclay et al. ................. | 702/60 |
| 7,894,943 | B2 | 2/2011 | Sloup et al. | |
| 8,019,567 | B2 * | 9/2011 | Steinberg et al. ............. | 702/130 |
| 2003/0171851 | A1 | 9/2003 | Brickfield | |
| 2004/0102937 | A1 | 5/2004 | Ibrahim | |
| 2004/0225649 | A1 | 11/2004 | Yeo et al. | |
| 2005/0038571 | A1 | 2/2005 | Brickfield et al. | |
| 2005/0043862 | A1 | 2/2005 | Brickfield et al. | |
| 2005/0192915 | A1 | 9/2005 | Ahmed et al. | |
| 2007/0005191 | A1 | 1/2007 | Sloup et al. | |
| 2007/0143045 | A1 | 6/2007 | MacGregor | |
| 2007/0255461 | A1 | 11/2007 | Brickfield et al. | |
| 2008/0177423 | A1 * | 7/2008 | Brickfield et al. ............. | 700/291 |
| 2011/0119042 | A1 * | 5/2011 | Johnson et al. ................. | 703/6 |
| 2011/0208365 | A1 * | 8/2011 | Miller ........................... | 700/291 |

OTHER PUBLICATIONS

Alberto Hernandez Neto, Flávio Augusto Sanzovo Fiorelli, Comparison between detailed model simulation and artificial neural network for forecasting building energy consumption, Energy and Buildings, vol. 40, Issue 12, 2008, pp. 2169-2176.*

Pitcher, John; U.S. Patent Application entitled: Balance Point Determination, U.S. Appl. No. 13/185,423, filed Jul. 18, 2011, 58 pgs.

* cited by examiner

*Primary Examiner* — Kakali Chaki
*Assistant Examiner* — Daniel Pellett
(74) *Attorney, Agent, or Firm* — Taylor English Duma LLP

(57) ABSTRACT

Systems and methods for predicting energy usage of an asset are provided. Among several implementations of methods implemented by a computer, one embodiment of a computer-implemented method includes selecting one of a plurality of base temperatures that allows a linear equation to estimate energy consumption by an asset as a function of an average daily demand on the asset to attain a desired temperature. The computer-implemented method also includes inserting the selected base temperature in a non-linear equation for modeling the asset's energy consumption.

18 Claims, 14 Drawing Sheets

PREDICTING ENERGY CONSUMPTION

CROSS-REFERENCE TO RELATED APPLICATIONS

This application claims the benefit of U.S. Provisional Application No. 61/423,482, filed Dec. 15, 2010, the entire disclosure of which is hereby incorporated by reference herein.

This application is related to a co-pending U.S. patent application filed on the same day as the present application, entitled "Analyzing Inputs to an Artificial Neural Network," and containing the same inventive entity, the entire disclosure of which is hereby incorporated by reference herein.

TECHNICAL FIELD

The present disclosure generally relates to energy usage, and more particularly relates to predicting energy usage.

BACKGROUND

Buildings typically include some type of system for heating and cooling the interior space of the building. For example, heating, ventilating, and air conditioning (HVAC) systems are often used for maintaining comfortable temperatures for building occupants. Since a majority of the energy that is consumed by a building may be traced to the operation of the HVAC system, it is usually beneficial to analyze the performance and operation of the HVAC system to avoid waste. Oftentimes, the characteristics of an HVAC may change over time due to various factors. Changes in performance may be a result of normal wear and tear, but may also indicate a need for routine preventative maintenance, repair, or replacement of one or more pieces of equipment. In addition, changes in the operation of the HVAC system (e.g., due to a change in the operating hours of the building) may cause a corresponding change in the energy consumption.

When the performance and operation of the energy-consuming systems of a building are monitored, test results can be presented to a building manager. As a result of receiving such test results, the building manager may be able to determine if HVAC equipment is operating properly or if maintenance, repair, or replacement is needed. Also, the building manager may be able to determine if the manner in which the HVAC system is being used could be changed to reduce energy costs. There may be several other concerns that a building manager may face. It may be beneficial for the building manager to investigate any anomalies in energy consumption data to determine if there is any energy waste that can be minimized by making various changes, such as changes in the equipment, changes in the operating hours of the equipment, or other changes.

SUMMARY

Systems, methods, and associated software are described for determining a balance point, or base temperature, for use in a non-linear model of energy usage for a building or asset, including receiving a plurality of weather measurements indicating weather conditions of a region in which an asset is located, wherein the plurality of weather measurements are obtained during a baseline time period, receiving a plurality of energy consumption measurements indicating amounts of energy consumed by the asset, wherein the energy consumption measurements are obtained during the baseline time period, calculating an average daily demand representing an energy demand on the asset to attain a predetermined range of temperatures, wherein the average daily demand is calculated for each of a plurality of billing periods in the baseline time period, utilizing a plurality of linear equations representing estimations of energy consumption as a function of the average daily demand for each respective billing period, wherein each linear equation corresponds to a respective one of a plurality of base temperatures, the base temperatures representing outdoor temperatures at which the asset is not needed to attain the predetermined range of temperatures, evaluating each of the linear equations based in part on how well the linear equation estimates actual energy consumption, selecting one of the base temperatures to be used in a non-linear model of the asset's energy consumption, the selected base temperature corresponding to the linear equation that best estimates the actual energy consumption.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
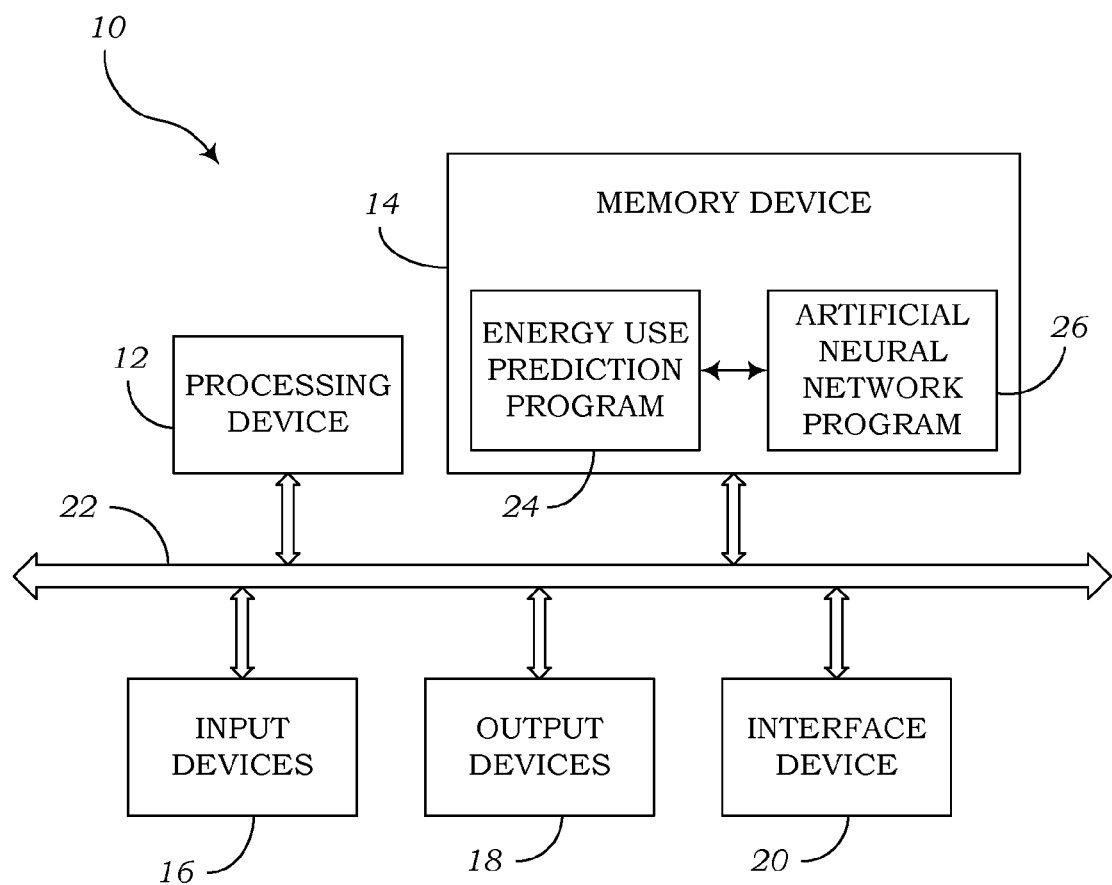
FIG. 1 is a block diagram illustrating a computer system according to various implementations of the present disclosure.

The present disclosure describes systems and methods for predicting an amount of energy that may be needed by an asset (e.g., building) to run various systems (electrical/computer system, heating system, cooling system, etc.). Heating, ventilating, and air-conditioning (HVAC) systems, which are used for keeping the inside temperature within a desirable temperature range, are usually the only significant loads that vary greatly based on weather. Most other loads, such as lighting and plug loads, typically operate fairly consistently based on time of day and day of week and do not normally change significantly with changes in weather. As described herein, a prediction of energy usage, to a large extent, depends on the HVAC system's demand as dictated by weather conditions outside the building. For example, when outdoor temperatures are cold (e.g., about 30° F.), a greater amount of energy would normally be needed to heat the inside of the building to a comfortable temperature than when outdoor temperatures are more moderate (e.g., about 50° F.). According to some embodiments, the asset described herein may be a storage tank that includes a temperature-controlled volume (e.g., a heated enclosure). Also, the asset may be any type of device or system for heating a specific volume of air, gas, water, liquid, or other fluid, wherein the heating device or system may be, for example but not limited to, an incubator, cooking device, tanning bed, sauna, furnace, pressurized tanks, or other heating devices or systems. The asset may also be any type of device or system for cooling a specific volume of air, gas, water, liquid, or other fluid, wherein the cooling device or system may be, for example but not limited to, a refrigerator, a freezer, a meat locker, a cryogenic tank, or other cooling devices or systems.

Predictions of energy usage may then be compared with actual energy consumption of the asset's or building's systems to determine any significant offset. If offsets are detected, notifications may be communicated to a manager of the asset or building. With the offset information, the manager is informed of possible issues with the systems that may require further investigation. In some embodiments, methods described herein may include monitoring the systems and equipment of the assets or buildings and generate alerts when differences between predicted energy consumption and actual energy consumption are greater than a predetermined threshold. Monitoring of these differences may be performed electronically or by visual observation. One purpose for monitoring significant offsets may be to detect if equipment may be malfunctioning. In addition, monitoring of the HVAC system may reveal if energy is being wasted, if routine preventative maintenance is needed, if the equipment's set points are set incorrectly, or other indications. Without attention, the HVAC system may be damaged, may continue to run inefficiently, or both. Also, an offset may be a sign that the manner in which the HVAC system is being utilized has changed (e.g., a change in the business hours, the installation of new equipment, etc.). Some offsets may represent an energy saving while others may represent wasted energy, which may be a result of equipment degradation or damage.

To detect the differences between predicted energy usage and actual energy usage, the systems and methods of the present disclosure may rely on two different technologies. The first technique is a rule-based system that includes a series of logical and analytical tests that detect equipment functionality. The second technique is the use of artificial neural networks (ANNs) to characterize the performance of an asset's energy consuming systems (e.g., a HVAC system or other equipment of a building). Once "trained," an ANN may be used to compare future performance of the HVAC system with how it reacted to similar weather conditions in the past. Any divergence may be indicative of any number of issues, which should be investigated in order to determine if equipment may need to be replaced or repaired, or if the manner in which the equipment is used may need to be changed.

One problem with monitoring HVAC systems or other heating or cooling systems may be that the only thing that is known about the equipment is the performance of the equipment when tested in a laboratory (e.g., according to ARI Standard 550/490). Once the equipment is installed in the field, however, the performance characteristics may be unknown. To monitor the operation of the equipment and detect anomalies, the systems and methods of the present disclosure may use the ARI/DOEII standards as a starting point to construct a model of actual performance. ANNs may be beneficial because they are able to be trained and retrained as needed to monitor the equipment operation while eliminating the factor of weather. Because weather conditions typically control how much energy might be needed to heat or cool a building, predicting an accurate energy demand based on weather allows the systems and methods herein to remove weather from the equation to monitor how the equipment is actually performing.

It is desirable in many situations to be able to measure the change in energy use of an asset as a result of changes in how the asset operates or as a result of upgrades of key pieces of equipment. One impediment to tracking the change in energy use is that the energy use for certain assets (e.g., buildings) is typically dominated by the heating and cooling demands, which are driven by the local weather. It cannot be expected that the weather after an asset change or upgrade will be the same as the weather beforehand. Therefore, mathematical models described herein may be used to capture the baseline behavior of the asset before a change or upgrade and then predict the energy use in the future as if the changes or upgrades had not been made. These predictions can then be compared to the actual asset energy use to provide a measurement of the improvement in asset operations and/or efficiency. This may be a valuable way to measure an amount of energy savings, reduction in carbon emissions, reduction in nitrous oxide levels, and other positive effects resulting from such a change or upgrade.

In order to obtain a reliable model for predicting energy usage, the systems and methods of the present disclosure observe weather conditions and energy usage over a baseline time period. It is the data from this baseline period that may be used to train the ANN. After the baseline period is complete and the ANN is trained, the ANN is able to accurately predict the amount of energy usage based on subsequent weather conditions. During this prediction period, the systems and methods of the present disclosure may then verify whether the asset actually uses the same amount of energy as is predicted or if there is a significant offset. A first set of embodiments described herein is related to predicting long-term energy use (e.g., over the course of several months). The baseline time period for training the ANN for long-term prediction may run for about one year, and then predictions may be made thereafter. A second set of embodiments described herein is related to predicting short-term energy use (e.g., over the course of several days). The baseline time period for training the ANN for short-term prediction may run for about two weeks, and then predictions may be made thereafter.

For the purpose of maintaining consistency among the various embodiments, temperatures described in the present disclosure may be referred to as being in units of Fahrenheit, unless otherwise noted. However, one of ordinary skill in the art will understand that units of Celsius may also be used.

System

FIG. 1 is a block diagram showing an embodiment of a computer system 10. As shown in this embodiment, the computer system 10 includes a processing device 12, a memory device 14, input devices 16, output devices 18, and an interface device 20, each interconnected with each other via a bus interface 22. The memory device 14 comprises, among other things, an energy use prediction program 24 and an artificial neural network (ANN) program 26. The ANN program 26 may be any suitable type of neural network, such as the product "Predict" from NeuralWare of Carnegie, Pa.

The processing device 12 may be a general-purpose or specific-purpose processor or microcontroller for controlling the operations and functions of the computer system 10. In some implementations, the processing device 12 may include a plurality of processors each designed for performing different functions within the computer system 10.

The memory device 14 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc.

The input devices 16 may include various data entry mechanisms, such as keyboards, keypads, buttons, switches, touch pads, touch screens, cursor control devices, computer mice, stylus-receptive components, voice-activated mechanisms, microphones, or other data entry mechanisms. The output devices 18 may include various data output mechanisms, such as computer monitors, display screens, touch screens, speakers, buzzers, alarms, notification devices, lights, light emitting diodes, liquid crystal displays, visual display devices, audio output devices, printers, or other data output devices. In some embodiments, the input devices 16 and output devices 18 may also include mechanisms configured to receive input and provide output, such as interaction devices, dongles, touch screen devices, and other input/output mechanisms, to enable input and/or output communication.

The interface device 20 is configured to enable communication between the computer system 10 and a network (e.g., the Internet). The interface device 20 may include modems, cable modems, routers, and/or other devices for transmitting data or information between the computer system 10 and the network. Other computer systems may be connected to the network, thereby allowing the computer system 10 to communicate with the other computer systems. For example, the other computer systems may include one or more computers or servers associated with the National Weather Service or other weather monitoring agencies, computers or servers associated with one or more asset (e.g., buildings) to be monitored, or other computer system or servers.

According to various embodiments of the present disclosure, the computer system 10 is configured to obtain and process data related to an asset. For example, the asset may be a building, such as an office building or a portion or portions of one or more office buildings owned, rented, or leased by one or more tenants. In some embodiments, the building may be a residential dwelling, school, library, restaurant, business, shop within a strip mall or department store, or any other type of structure that uses one or more HVAC systems for controlling indoor temperature within the building.

The computer system 10 may obtain data associated with two different types of measurements associated with the asset. The first type of measurement that the computer system 10 obtains is an amount of energy consumed by the asset. The energy consumption data may be obtained during a baseline period (e.g., for training the ANN program 26) and also during a prediction period (e.g., for comparing the predictions with actual amounts). The second type of measurement that the computer system 10 obtains is an observation of weather conditions in a region in which the asset is located. The weather data may also be obtained during the baseline period and prediction period. The weather conditions may include outdoor temperature (e.g., dry-bulb temperature, wet-bulb temperature, etc.), humidity, barometric pressure, cloud cover, solar radiation, and/or other parameters. The term "dry-bulb temperature" refers to a temperature without the aspect of humidity. The term "wet-bulb temperature" refers to a temperature that includes humidity and may experience cooling due to evaporation of the humidity. When the weather includes high humidity, dry-bulb and wet-bulb temperatures are similar, but when it is dry, the wet-bulb temperature is much lower than the dry-bulb temperature.

The computer system 10 may obtain the energy consumption measurements in a variety of ways. According to some embodiments, the computer system 10 may be configured to communicate via the interface device 22 with one or more computers that monitor energy use associated with various energy-consuming systems (e.g., HVAC systems) of the asset being observed. The computers associated with the asset may be configured to measure energy consumption (kilowatt-hours, or KWHs) on an ongoing basis (e.g., every 30 minutes) and periodically report the measurements to the computer system 10. According to other embodiments, the computer system 10 may obtain energy consumption measurements from energy bills provided by one or more energy companies that service the building. Typically, energy bills are provided about once a month. These measurements may be entered electronically via the interface device 20. In some embodiments, the measurements may be entered manually by an operator using the input devices 16.

Regarding the receipt of weather condition measurements, the computer system 10 may be configured to receive weather data via the interface device 20 from the National Weather Service or other agency or organization that monitors weather in the region where the building is located. In other embodiments, weather measurements may be received from one or more sources and entered into the computer system 10 electronically via the interface device 20. According to other various implementations, the weather data may be entered manually via the input devices 16.

When the measurements are obtained, the energy use prediction program 24 is configured to process the data by performing various calculations and statistical analyses. In some embodiments with respect to long-term prediction, this processing allows the energy use prediction program 24 to select a value for a heating base temperature (HB) from a plurality of possible values and a value for a cooling base temperature (CB) from a plurality of possible values. The pair of values for HB and CB may be selected by the energy use prediction program 24 based on how well these values allow a linear module to predict the actual energy consumption. The long-term prediction techniques are described in more detail below with respect to FIGS. 2-8.

After the energy use prediction program 24 selects the values for HB and CB, according to various long-term prediction embodiments, the energy use prediction program 24 then calculates the average daily heating demand and the average daily cooling demand. The average daily demands are based in part on the outdoor temperatures at periodic times during a number of billing periods within the baseline period. The energy use prediction program 24 supplies the average daily heating demand calculations and average daily cooling demand calculations to the ANN program 26 over the billing periods. Also supplied to the ANN program 26 are calculations of an average daily amount of energy consumed over each of the billing periods. In response to receiving information about the heating demands, cooling demands, and actual amounts of energy used, the ANN program 26 may be trained to predict future energy usage as a function of heating and cooling demands. As with many neural networks, the ANN program 26 in the present disclosure may utilize non-linear functions. Therefore, the ANN program 26 is configured to model or approximate at least one non-linear function or equation to predict energy consumption.

With regard to embodiments pertaining to short-term prediction models, the energy use prediction program 24 may be configured to calculate an hourly energy usage amount. The hourly usage, along with weather condition data, may be supplied to the ANN program 26. In addition to energy and weather condition information, the ANN program 26 also obtains day of the week information and hour of the day information for predicting energy use on a short-term basis. The short-term prediction techniques are described in more detail below with respect to FIGS. 9-14.

The energy use prediction program 24 and ANN program 26 of the present disclosure may be implemented in hardware, software, firmware, or any combinations thereof. In various implementations, logical instructions, commands, and/or code can be implemented in software, firmware, or both, and stored in the memory device 14. In this respect, the logic code may be implemented as one or more computer programs that can be executed by the processing device 12. As illustrated in FIG. 1, the energy use prediction program 24 and ANN program 26 are implemented in software or firmware that is stored on the memory device 14 and may be executed by the processing device 12. According to other various embodiments, the energy use prediction program 24 and/or ANN program 26 may be implemented in hardware (e.g., in the processing device 12) using discrete logic circuitry, an application specific integrated circuit (ASIC), a programmable gate array (PGA), a field programmable gate array (FPGA), or any combinations thereof.

The energy use prediction program 24 and ANN program 26 may each comprise an ordered listing of executable instructions for implementing logical functions. These programs may be embodied in any computer-readable medium for use by an instruction execution system or device, such as a computer-based system, processor-controlled system, etc. The computer-readable medium can be any medium that can contain, store, communicate, propagate, or transport programs for execution by the instruction execution system or device. A non-exhaustive list of computer-readable media includes media stored and/or accessed using electronic, magnetic, electromagnetic, optical, infrared, or other means. The computer-readable media may include one or more suitable physical media components that can store the software, programs, or computer code for a measurable length of time.

Means for Predicting Long-Term Energy Use

Figure 2:
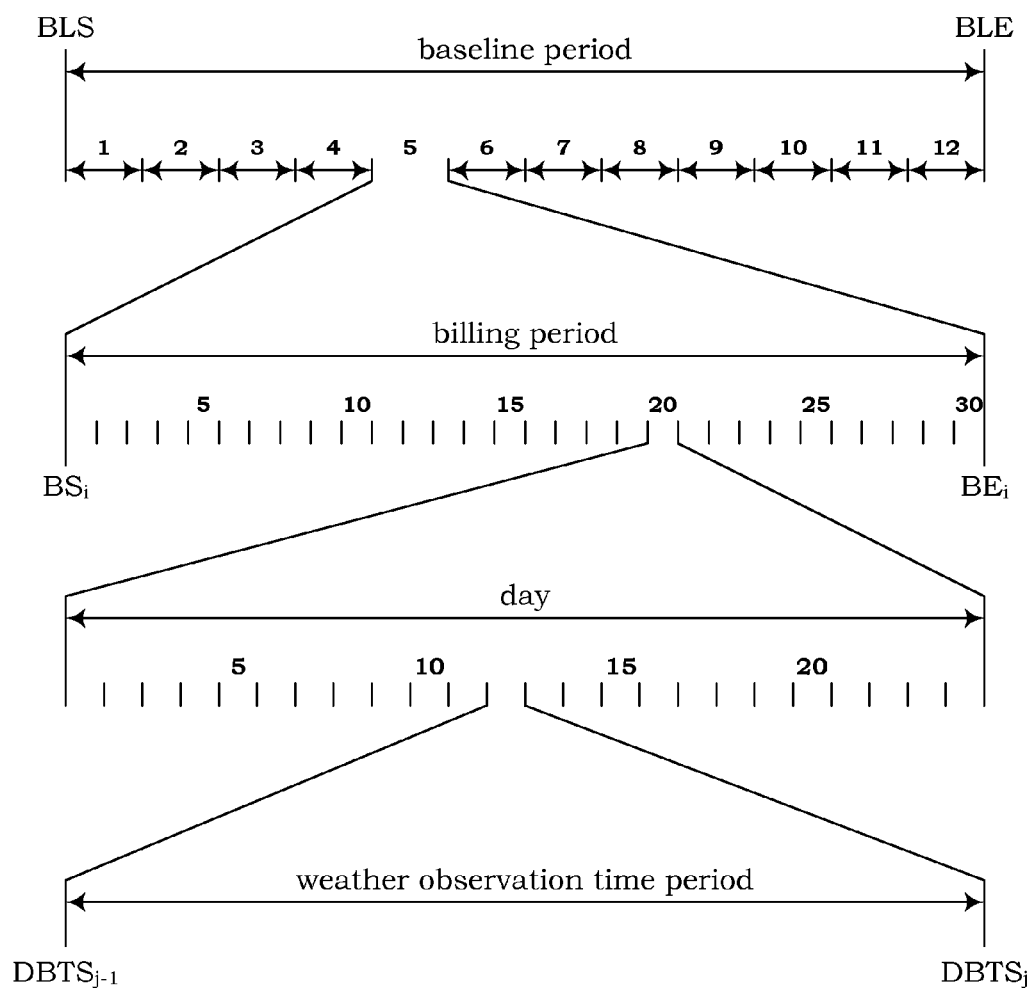
FIG. 2 is a diagram illustrating a representation of various time periods over which measurements are observed for a long-term prediction model, according to various implementations of the present disclosure.

FIG. 2 is a diagram showing an example of various time periods during which measurements are obtained for analysis. Measurements of energy consumption and weather conditions may be obtained over the length of a "baseline period," as shown at the top of FIG. 2. According to some embodiments, the baseline period may cover at least one year in order to obtain samples during each of the four seasons. The baseline period runs from a baseline start time (BLS) to a baseline end time (BLE) and can include any number of billing periods. As illustrated in this example, the baseline period includes 12 billing periods.

Below the baseline period time line shown in FIG. 2, the fifth "billing period" of the baseline period in this example is expanded out to show the details of the billing period, such as the number of days (e.g., 30 days in this example). Each billing period covers about one month and may vary depending on when energy company personnel are able to read the energy meters. A billing period "i" runs from a billing start time ($BS_i$) to a billing end time ($BE_i$).

The twentieth "day" of the billing period in this example is expanded out below the billing period to show the details of the day, such as a number of weather observation time periods during the day (e.g., 24 observations in this example). Each weather observation time period is actually the time between weather observations or between the reporting of these observations. In some implementations, weather observations are made about once every hour. Occasionally, however, an observation may be skipped (or may not be reported) and the weather observation time period may be about two hours. Weather observations may include any number of records, such as dry bulb temperature (DB), wet bulb temperature (WB), humidity, barometric pressure, cloud cover, visibility, solar radiation, etc. In the example illustrated, the dry bulb temperature $DB_j$ is observed at a dry bulb time stamp $DBTS_j$, where the previous time stamp is $DBTS_{j-1}$. The variable "j" in these examples refers to a particular time stamp when weather was observed.

In addition to the weather observation data, energy consumption information may also be recorded. This information may be extracted, for example, from energy bills from one or more energy companies. The energy consumption information includes the amount of energy used during each respective billing period, which, for billing period i, runs from $BS_i$ to $BE_i$. Energy consumption is normally measured in KWHs, where $KWH_i$ is the energy consumption for billing period i.

An obstacle for conventional methods of processing this data is the disparity between the billing data, which is typically collected monthly, and the weather data, which is typically collected hourly. For example, there may be approximately 720 weather readings over the course of a typical month corresponding to a single utility bill reading. It was discovered that temperature averages or monthly high and low temperature values hide a large amount of the detail that exists in the actual weather data. The daily weather cycle, which includes the information obtained hourly, may be used to determine an accurate approximation of how much energy is actually needed by the heating or cooling equipment associated with an asset (e.g., a building's HVAC system).

To assist in capturing a monthly view of the daily weather cycle, an average daily heating demand and average daily cooling demand are calculated and represented in units of "degree-days." An offset is calculated between outdoor temperature readings (obtained about once per hour) and a given base temperature. The hourly offsets are multiplied by the amount of time, in days, spent at that temperature offset and then summed and averaged to determine the degree-day calculation. The base temperature may be referred to as the building's balance point, i.e., an outdoor air temperature at which, when it is reached, heating or cooling is not needed to attain a certain indoor temperature. In the present disclosure, two base temperatures are used, one for a heating mode and one for a cooling mode.

Figure 3:
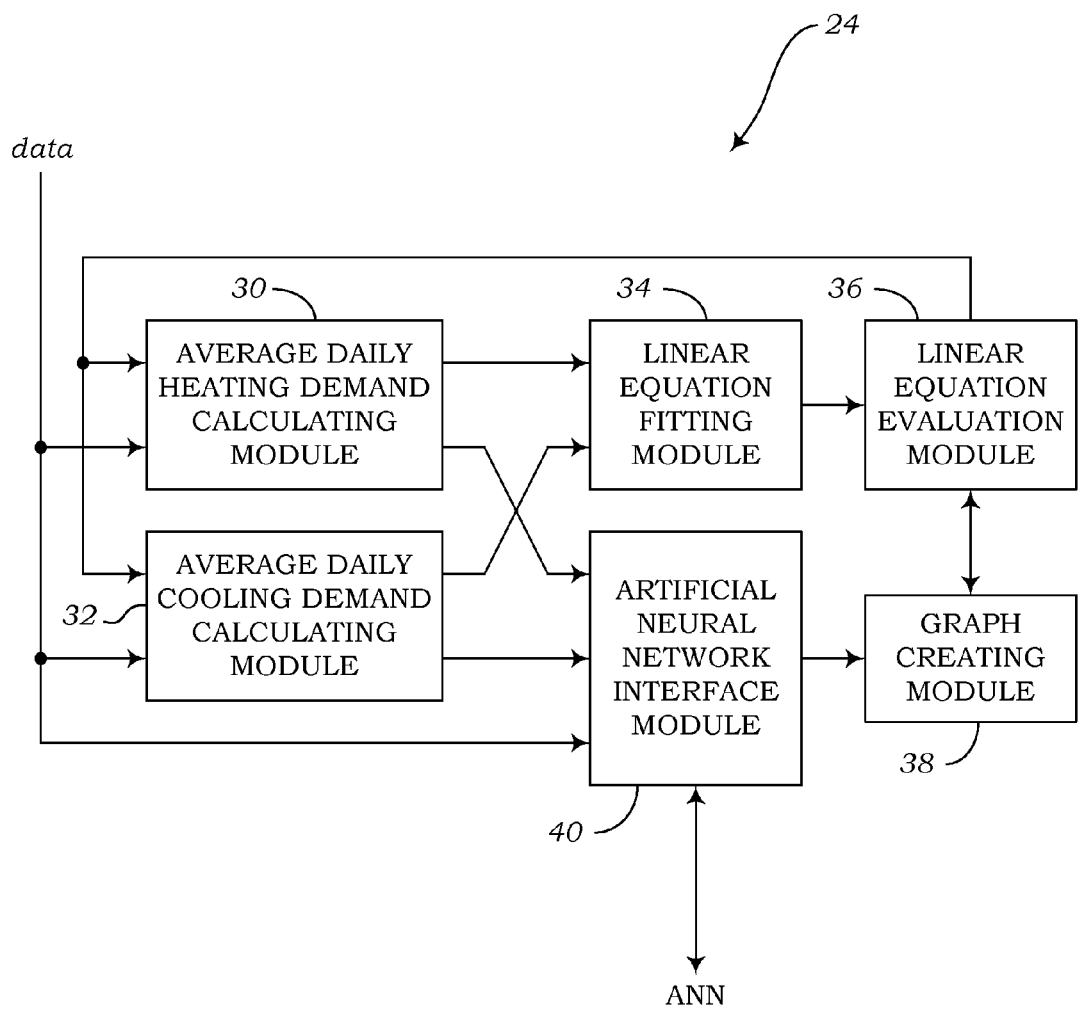
FIG. 3 is a block diagram illustrating a first embodiment of the energy use prediction program shown in FIG. 1, according to various implementations of the present disclosure.

FIG. 3 is a block diagram of a first embodiment of the energy use prediction program 24 shown in FIG. 1. As shown in this embodiment, the energy use prediction program 24 includes an average daily heating demand calculating module 30, an average daily cooling demand calculating module 32, a linear equation fitting module 34, a linear equation evaluation module 36, a graph creating module 38, and an artificial neural network (ANN) interface module 40. The energy use prediction program 24 is configured to receive data relating to temperature measurements and energy usage during a baseline time period. The data is processed by the energy use prediction program 24 to determine a linear equation and related coefficients for fitting the inputs relating to temperatures with outputs relating to energy usage.

As described above, data pertaining to various measurements are obtained by the computer system 10. The energy consumption data and weather condition data are provided to the average daily heating demand calculating module 30 and average daily cooling demand calculating module 32. The calculated average daily heating demand and average daily cooling demand are measures of an average amount of energy (in degree-days) needed per day to attain a desired indoor temperature. A degree-day is the product of an offset between an outdoor temperature and a base temperature and the amount of time, in days, spent at that temperature offset.

The average daily demand for each billing period i are calculated using the following equations. The average daily heating demand calculating module 30 is configured to calculate the average daily heating demand ($H_i$) over billing period i using the formula:

$$H_i = \frac{\sum_j \max(HB - DB_j, 0) * (DBTS_j - DBTS_{j-1})}{1 + BE_i - BS_i}$$

$$\forall j : BS_i \leq DBTS_j \leq BE_i$$

where HB is a heating base temperature selected from a plurality of heating base temperatures, $DB_j$ is a dry bulb temperature measurement at a timestamp j, $DBTS_j$ and $DBTS_{j-1}$ are current and prior timestamps j and j−1, $BS_i$ is a start date for billing period i, and $BE_i$ is an end date for billing period i. According to some embodiments, $H_i$ may represent an amount indicating how hard the heating system needs to work to achieve a desired temperature.

The average daily cooling demand calculating module 32 is configured to calculate the average daily cooling demand ($C_i$) over the billing period i using the formula:

$$C_i = \frac{\sum_j \max(DB_j - CB, 0) * (DBTS_j - DBTS_{j-1})}{1 + BE_i - BS_i}$$

$$\forall j : BS_i \leq DBTS_j \leq BE_i$$

where CB is a cooling base temperature selected from a plurality of cooling base temperatures. According to some embodiments, $C_i$ may represent an amount indicating how hard the cooling system needs to work to achieve a desired temperature.

An example is given here regarding the calculation of the average daily heating demand $H_i$. It is assumed in this example that the heating base temperature HB is 55° and the hypothetical dry-bulb temperature measurements are taken during one day.

| Time | Temperature | HB-DB$_j$ | DBTS$_j$-DBTS$_{j-1}$ |
|---|---|---|---|
| 12:05 am | 38 | 17 | 60/1440 |
| 1:10 am | 37 | 18 | 65/1440 |
| 2:10 am | 37 | 18 | 60/1440 |
| 3:00 am | 38 | 17 | 50/1440 |
| 5:05 am | 39 | 16 | 125/1440 |
| 6:10 am | 41 | 14 | 65/1440 |
| 7:05 am | 46 | 9 | 55/1440 |
| 8:15 am | 50 | 5 | 70/1440 |
| 9:00 am | 51 | 4 | 45/1440 |
| 10:05 am | 52 | 3 | 65/1440 |
| 11:05 am | 52 | 3 | 60/1440 |
| 12:05 pm | 52 | 3 | 60/1440 |
| 1:15 pm | 54 | 1 | 70/1440 |
| 2:10 pm | 56 | −1 | 55/1440 |
| 3:10 pm | 57 | −2 | 60/1440 |
| 4:05 pm | 55 | 0 | 55/1440 |
| 5:05 pm | 54 | 1 | 60/1440 |
| 6:05 pm | 52 | 3 | 60/1440 |
| 7:10 pm | 49 | 6 | 65/1440 |
| 8:00 pm | 45 | 10 | 50/1440 |
| 10:05 pm | 40 | 15 | 125/1440 |
| 11:00 pm | 39 | 16 | 55/1440 |

$H_i$ is calculated using the above equation, where the heating demand for this one day is equal to (17*(60/1440))+(18*(65/1440))+(18*(60/1440))+(17*(50/1440))+(16*(125/1440))+(14*(65/1440))+(9*(55/1440))+(5*(70/1440))+(4*(45/1440))+(3*(65/1440))+(3*(60/1440))+(3*(60/1440))+(1*(70/1440))+(0*(55/1440))+(0*(60/1440))+(0*(55/1440))+(1*(60/1440))+(3*(60/1440))+(6*(65/1440))+(10*(50/1440))+(15*(125/1440))+(16*(55/1440))=8.72 degree-days. The heating demand is calculated for the other days of the billing period i and summed together to find the total heating demand for the month. This total is averaged by dividing by the number of days in the billing cycle, i.e., $BE_i-BS_i+1$, to provide the average daily heating demand $H_i$ for the billing month i.

The average daily heating demand $H_i$ (calculated by the average daily heating demand calculating module 30) and the average daily cooling demand $C_i$ (calculated by the average daily cooling demand calculating module 32) are supplied to the linear equation fitting module 34. The linear equation fitting module 34 is configured to associate the energy consumed during each billing cycle i with the average daily heating demand $H_i$ and average daily cooling demand $C_i$. A linear model of the energy consumption (KWHLIN) as a function of $H_i$ and $C_i$ may be constructed for predicting the weather-dependent energy use of an asset as follows:

$$KWHLIN_k(H_i, C_i) = A1_k + (A2_k * H_i) + (A3_k * C_i)$$

where A1 is a coefficient representing a factor of energy usage that is not associated with heating and cooling, A2 is a coefficient representing a factor of energy usage associated with the heating demand, and A3 is a coefficient representing a factor of energy usage associated with the cooling demand.

Each possible combination of values for the heating base temperature HB and cooling base temperature CB are used to determine multiple calculations of $H_i$ and $C_i$. The subscript k indicates a particular HB, CB combination, where a family of linear models that may be built by varying the chosen base temperatures. A linear building model of the linear equation fitting module 34 may be used for the purpose of finding optimal heating and cooling degree-day base temperatures, $HB_{opt}$ and $CB_{opt}$, which provide a best fit for the linear equations. The linear equation fitting module 34 determines the constant coefficients $A1_k$, $A2_k$, and $A3_k$ by performing a standard linear least-squares analysis to fit the energy consumption data from the multiple billing periods throughout the baseline period with the average daily heating and cooling demands Hi and Ci from the corresponding billing periods.

The linear building models computed by the linear equation fitting module 34 are then supplied to the linear equation evaluation module 36. The linear equation evaluation module 36 is configured to evaluate the linear models with the actual billing data, $KWH_i$, using, in one implementation, the coefficient of determination, $R^2$:

$$R^2 = 1 - \frac{\sum (e - \bar{e})^2}{\sum (y - \bar{y})^2}$$

where $e = KWH_i - KWHLIN_{k,i} * (1 + BE_i - BS_i)$, $\bar{\rho}$=average of all "e"s, $y = KWH_i$, and $\bar{y}$=average of all "y"s. $\forall i \in [BLS, BLE]$ Note that it is necessary to multiply $KWHLIN_k$ by the number of days in the billing period to obtain a value comparable with the billed energy use, $KWH_i$. According to some embodiments, $R^2$ may represent a value indicating how well the linear model predicts the results, or how much of the variation in the output is explained by the variation in the input.

The linear equation evaluation module 36 may be configured to determine $HB_{opt}$ and $CB_{opt}$ by the pair of HBs and CBs that provides the highest $R^2$ value. In some embodiments, the results of the $R^2$ calculations may be plotted on a graph using the graph creating module 38.

Figure 4:
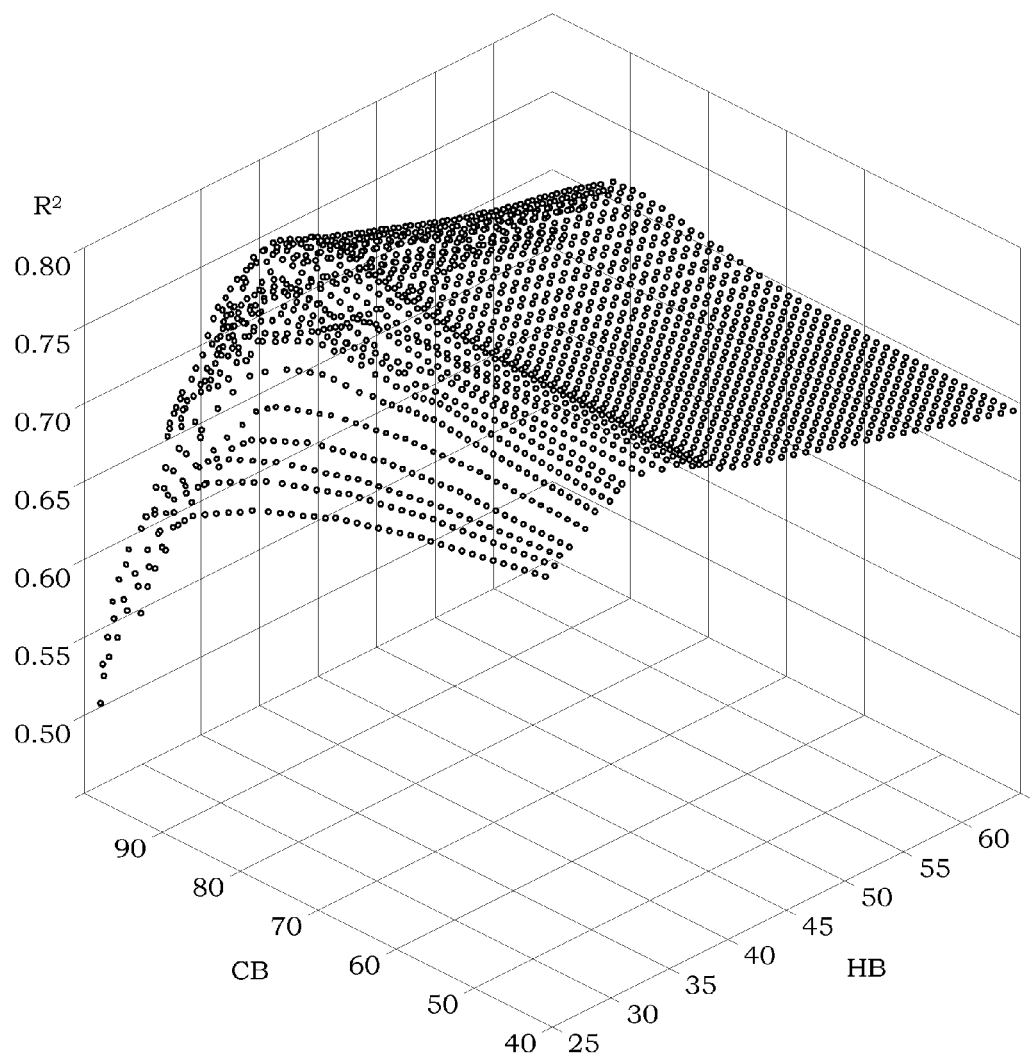
FIG. 4 is a three-dimensional graph showing an evaluation of how well exemplary linear equations predict outputs, according to various implementations of the present disclosure.

FIG. 4 is a three-dimensional graph showing the results of a calculation of $R^2$ for different pairs of values for the heating base temperature HB and the cooling base temperature CB. The results shown in the graph are taken from hypothetical energy and weather data for the given baseline period. The optimal base points, $HB_{opt}$ and $CB_{opt}$, may be determined by observing the graph of FIG. 4 over the ranges of potential heating and cooling base temperatures. In the example of FIG. 4, $HB_{opt}=39$, $CB_{opt}=84$, and at that point, the value $R^2=0.783194$. These values may also be obtained by mathematical calculation, such as by using the linear equation evaluation module 36.

Referring again to FIG. 3, when the linear equation evaluation module 36 determines the optimal base temperatures, these values are supplied back to the average daily heating demand calculating module 30 and average daily cooling demand calculating module 32. The average daily heating demand calculating module 30 again calculates $H_i$, except this time only using HB equal to $HB_{opt}$. Likewise, the average daily cooling demand calculating module 32 again calculates $C_i$, except this time only using CB equal to $CB_{opt}$. The $H_i$s and $C_i$s are calculated for each billing cycle in the baseline period using the optimal base temperatures.

$H_i \forall i \in [BLS, BLE]$ using $HB_{opt}$ $C_i \forall i \in [BLS, BLE]$ using $CB_{opt}$ These values are then supplied to the ANN interface module 40. The ANN interface module 40 also receives the asset's actual energy consumption data for each billing period and the number of days in each billing period over the course of the baseline period, where the average daily energy consumption is equal to:

$$\frac{KWH_i}{BE_i - BS_i + 1} \forall i \in [BLS, BLE]$$

The ANN interface module 40 supplies these values to the ANN program 26 (FIG. 1). In order to properly train the ANN program 26, the average daily heating and cooling demands $H_i$ and $C_i$ are provided as inputs and the average daily energy consumption $(KWH_i)/(BE_i - BS_i + 1)$ is provided as an output. Thus, the ANN program 26 may be trained accordingly.

Figure 5:
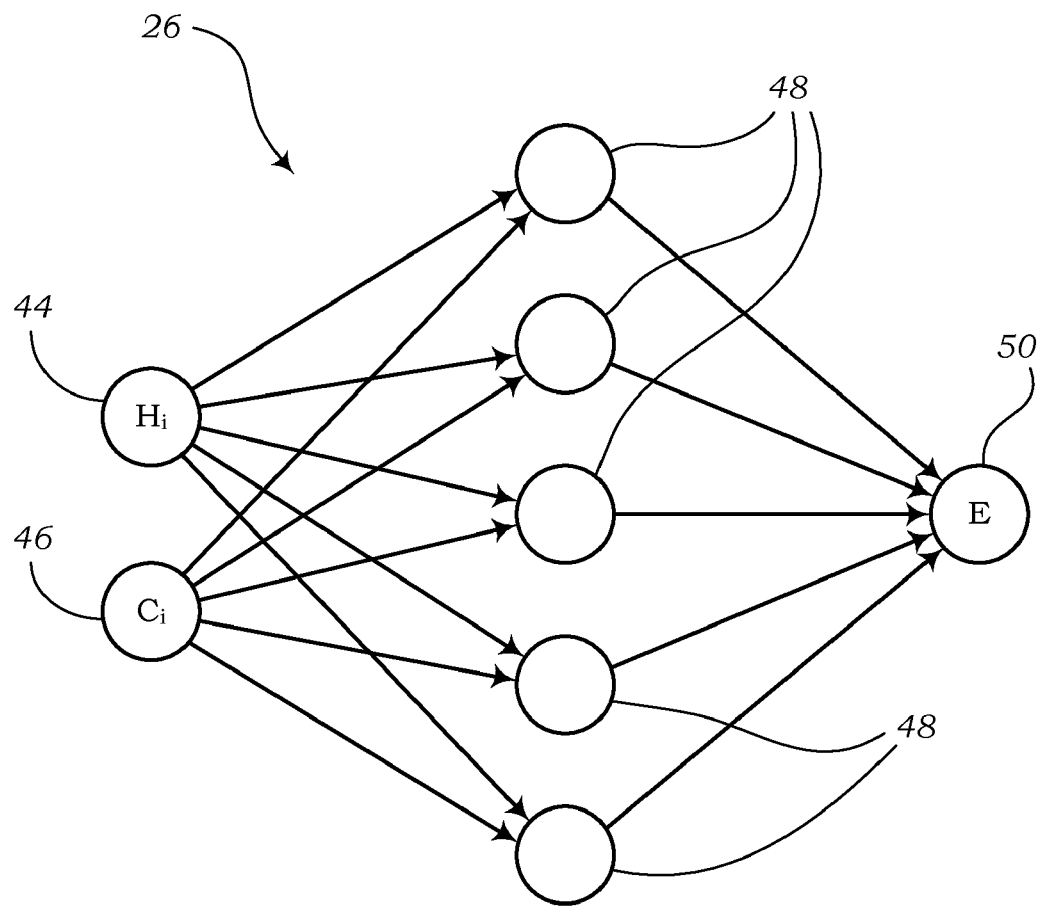
FIG. 5 is a diagram illustrating a first embodiment of the artificial neural network (ANN) program shown in FIG. 1, according to various implementations of the present disclosure.

FIG. 5 is a diagram illustrating a first embodiment of the ANN program 26 shown in FIG. 1 for creating a long-term prediction model. In this embodiment, the ANN program 26 includes a first input node 44 for the variable $H_i$ and a second input node 46 for the variable $C_i$. The ANN program 26 also includes a middle layer of processing nodes 48, which may be configured to perform any combination of exponential calculations, logarithmic calculations, algorithms, equations, etc. The output node 50 of the ANN program 26 is the average daily energy consumption value.

The ANN program 26 is considered to be a universal approximator. By supplying the sample input values and an output, the ANN may be configured as necessary to model the energy systems of the asset in a generic manner. The configuration process may be referred to as training, which may involve a variety of techniques, such as back propagation and other mathematical and statistical processes. The ANN program 26 is capable of learning this training process quickly and accurately with little human involvement. In some embodiments, the ANN program 26 may be a multilayer feed-forward artificial neural network, which has been proven mathematically to be a true universal approximator of any continuous nonlinear function. Once the inputs and output are used for training, the ANN program 26 may then be used to provide an accurate prediction of energy use during a prediction period following the baseline period.

Figure 6:
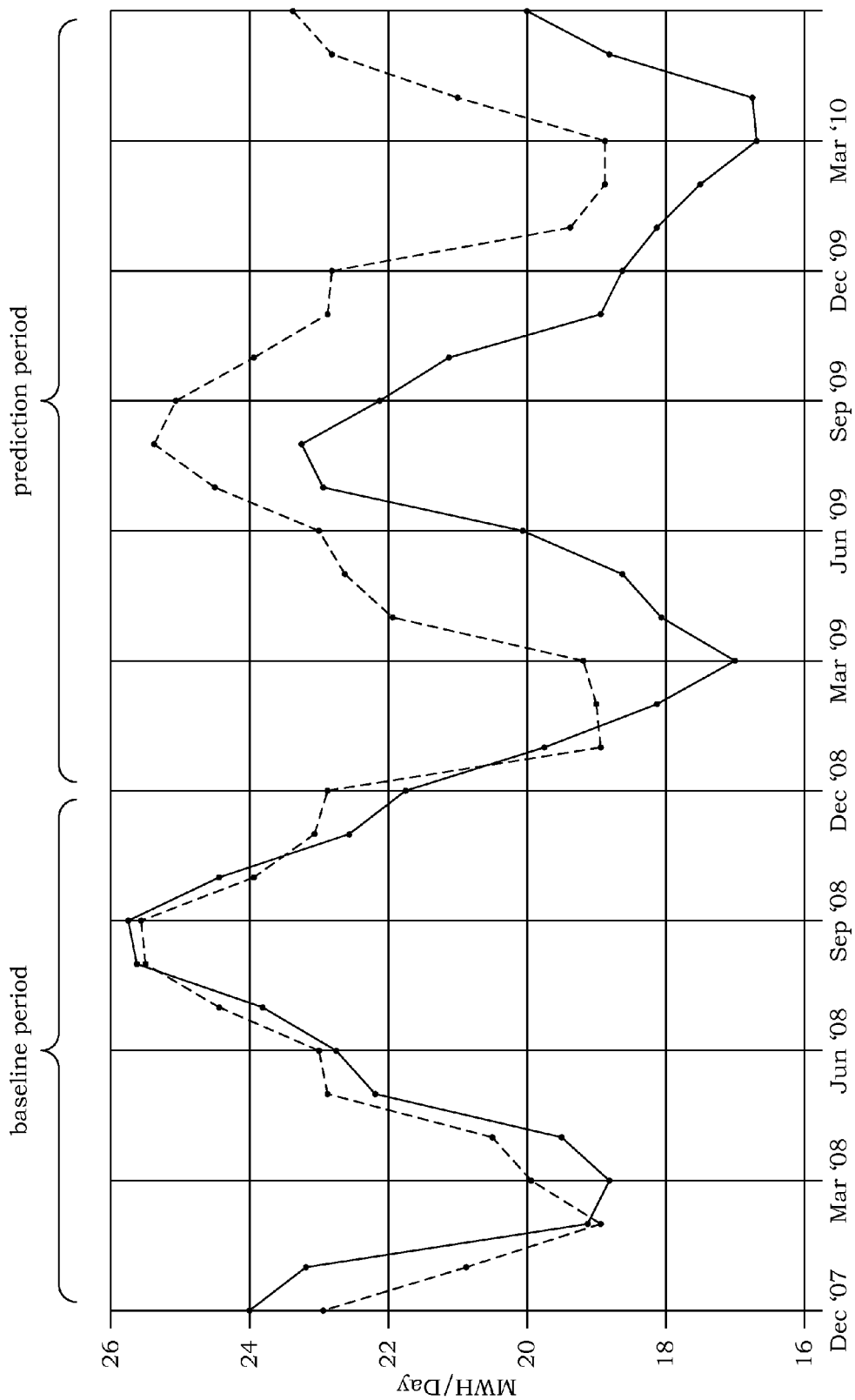
FIG. 6 is a graph showing predicted and actual energy usage of an exemplary asset (e.g., building), according to various implementations of the present disclosure.

FIG. 6 shows a graph showing a first plot (solid line) of actual energy usage billed by the utility company and a second plot (dashed line) of energy usage predicted by the ANN for an exemplary asset. A first portion of the graph shows a baseline period covering about one year. The data from this period is supplied to the ANN as described above to train the ANN to create a model for predicting energy usage. A second portion of the graph show a prediction period that follows the baseline training period. It may be noticed how the prediction maintains a similar shape and amplitude as the actual values, with minor offsets. The ups and downs of the plots may be attributed to weather changes throughout the months. There is, however, a large discrepancy between the billed energy usage and the predicted usage beginning near the start of 2009. Although this may appear to be a problem with the accuracy of the predictions, other factors may be involved. In this example, the discrepancy between the actual energy use and the predicted energy use is due to a reduction of the asset's operating hours. Since the information of the change in store hours was not applied to the prediction model, the predicted energy use may be used to inform a manager of the asset how much energy was saved by reducing the operating hours.

Methods of Predicting Long-Term Energy Use

Figure 7:
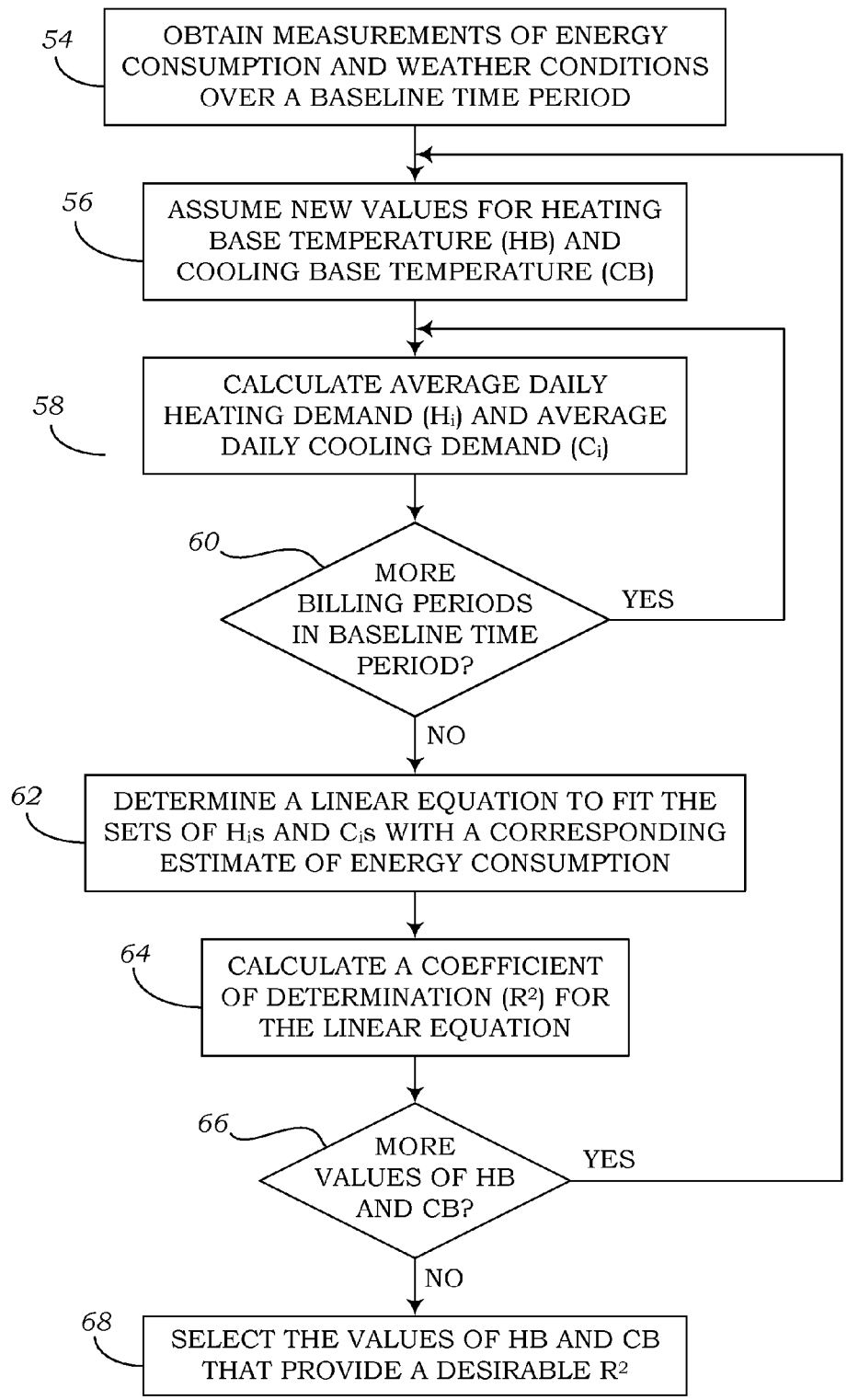
FIG. 7 is a flow diagram illustrating a method of determining heating and cooling base temperatures, according to various implementations of the present disclosure.

FIG. 7 is a flow diagram of an embodiment of a method of selecting heating and cooling base temperatures. As indicated in block 54, the method includes obtaining measurements of energy consumption and weather conditions over a baseline time period. According to various embodiments, the baseline time period for the long-term prediction model may be about one year or more. In block 56, it is indicated that new values for heating base temperature (HB) and cooling base temperature (CB) are assumed. The HB value may range from about 25° to about 65° and the CB value may range from about 40° to about 95°. As indicated in block 58, the average daily heating demand ($H_i$) and average daily cooling demand ($C_i$) are calculated. It is then determined in decision block 60 whether more billing periods are included in the baseline time period for the assumed combination of HB and CB. If so, the method returns back to block 58 to calculate $H_i$ and $C_i$ for the additional billing periods. If it is determined in decision block 60 that no more billing periods are included in the baseline time period, then the method proceeds to block 62.

As indicated in block 62, a linear equation is determined for fitting the sets of $H_i$s and $C_i$s with a corresponding estimate of energy consumption for that HB, CB combination. For this linear equation, a coefficient of determination ($R^2$) is calculated, as indicated in block 64. The coefficient of determination represents how well the changes in the outputs explain the changes in the inputs. This coefficient is determined for the specific HB, CB pair. It is then determined in decision block 66 whether more values of HB and CB are to be used or if all potential combinations have already been processed. If more values are to be tried, then the method returns back to block 56 and new values for HB and CB are assumed. Otherwise, if no more values for HB and CB are to be tried, the method proceeds to block 68. In block 68, it is indicated that the method includes selecting the pair of values for the heating base temperature HB and cooling base temperature CB that provide a desirable $R^2$. For example, a selected pair of HB and CB may be those values for which their corresponding $R^2$ value is higher than most or all of the other pairs.

Figure 8:
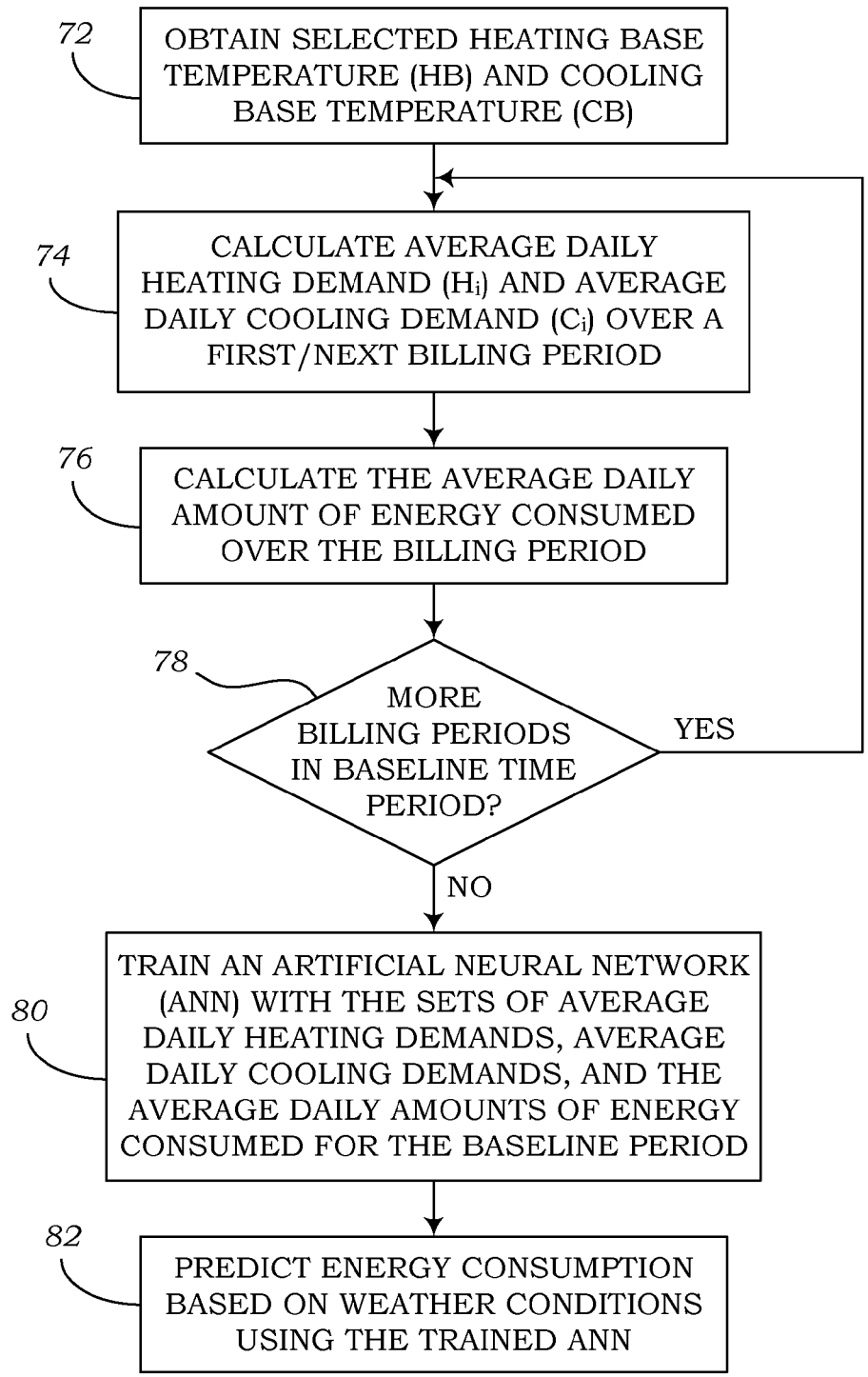
FIG. 8 is flow diagram illustrating a method of predicting energy usage, according to various implementations of the present disclosure.

FIG. 8 is a flow diagram illustrating an embodiment of a method for predicting energy usage in the long-term model. As indicated in block 72, the process includes obtaining a selected heating base temperature (HB) and a cooling base temperature (CB). These values, for example, may be those selected by the method of FIG. 7. As indicated in block 74, the average daily heating demand ($H_i$) and average daily cooling demand ($C_i$) are calculated. This calculation is for a period of time over a first billing period (i.e., i=1). The calculation may also be repeated for one or more of the next billing periods, if any. In block 76, it is indicated that the average daily amount of energy consumed over the billing period is calculated. The average daily amount of energy consumed may be equal to a total amount of energy used during the billing period divided by the number of days in the billing period. It is then determined according to decision block 78 whether more billing periods are included in the baseline time period. If so, the method returns back to block 74 to calculate the heating and cooling demands and energy consumed for the next billing periods. If no more billing periods are in the baseline time period, the method proceeds to block 80.

As indicated in block 80, the method includes training an artificial neural network (ANN) with the sets of average daily heating demand values, average daily cooling demand values, and the average daily amounts of energy consumed. The demand values are applied as inputs and the energy consumption amounts are applied as outputs. The ANN is trained with this information for the billing periods within the baseline time period. As indicated in block 82, the method includes predicting the energy consumption based on weather conditions using the trained ANN. The predictions in this regard are made after the baseline time period.

The flow diagrams of FIGS. 7 and 8 show the architecture, functionality, and operation of various implementations of the energy use prediction program 24. It should be understood that the routines, steps, processes, or operations described herein may represent any module or code sequence that can be implemented in software or firmware. In this regard, each block may represent a module, segment, portion of code, etc., which comprises one or more executable instructions for performing the specified logical functions. It should further be noted that the functions described with respect to the blocks may occur in a different order than shown. For example, two or more blocks may be executed substantially concurrently, in a reverse order, or in any other sequence depending on the particular functionality involved.

Means for Predicting Short-Term Energy Use

Another modeling example is described that operates on a significantly shorter timescale than the baseline time period of about one year as discussed in the above embodiments. The short-term model of analyzing the energy usage of an asset is capable of detecting anomalies in the daily energy use patterns. Typical anomalies that may be detected with this method include sets of lights or equipment left running overnight, unscheduled high-demand activities, heavy HVAC use during unoccupied hours, or other variations from normal asset operation.

The short-term model includes a baseline time period on the order of about 3 to 20 days. The system obtains data of energy usage on an ongoing basis, such as once every five minutes, ten minutes, fifteen minutes, thirty minutes, an hour, or other fixed (or variable) frequency. In addition to energy usage information, the system also obtains data concerning the hourly weather data for the local area. The weather data may contain measurements of dry-bulb temperature, wet-bulb temperature, and solar radiation attenuated by cloud cover. The system also tracks the time of day and day of the week. Using the weather conditions and time information as inputs and the energy usage as an output, the data may be fed to an ANN for training over the shorter baseline training period.

Then, when the ANN is trained, the system is able to predict the hourly power demand using the hourly weather data and the various times of the week. In the short-term model, it should be noted that the operating schedule of the asset does not need to be known, because the ANN may be able to discover the operating hours based on the training information. Given the weather data and time, the system is configured to predict the energy usage. Any significant discrepancy between the actual energy usage and the predicted energy usage may be analyzed for determining short-term modifications or variations from the normal operation of the asset. In addition, the information that is used for making predictions for one week or so may also be used to retrain the ANN for the following week, and so on. Therefore, the ANN may be retrained as necessary to account for changing seasons, holidays, or other factors that may have an effect on asset operation (e.g., building hours).

Figure 9:
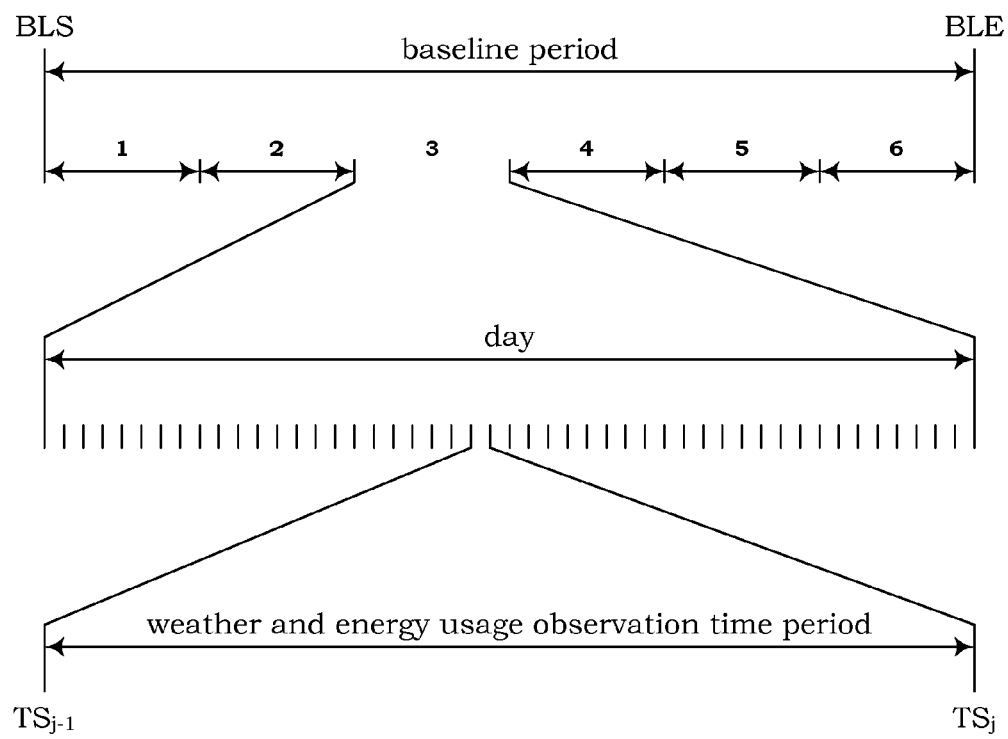
FIG. 9 is a diagram illustrating a representation of various time periods over which measurements are observed for a short-term prediction model, according to various implementations of the present disclosure.

FIG. 9 is a diagram showing an example of various time periods during which measurements are obtained for analysis for the short-term prediction model. This diagram is similar to the diagram of FIG. 2, except that the baseline period is much shorter and the system does not rely on billing periods. Measurements of energy consumption and weather conditions may be obtained over the length of the "baseline period," as shown at the top of FIG. 9. According to some embodiments, the baseline period may cover about one week or more in order to obtain samples for each day of the week. Weekly analysis may be particularly beneficial for buildings that have reduced hours over the weekend and/or increased hours during certain weekdays. The baseline period runs from a baseline start time (BLS) to a baseline end time (BLE) and can include any number of days. As illustrated in this example, the baseline period includes six days.

The third day of the baseline period in this example is expanded out below the baseline period to show the details of the day. As shown in this embodiment, the day is broken up into 48 different time periods. Weather observations may be made about 24 times (e.g., about once per hour) and energy usage observations may be made about 48 times (e.g., about once every 30 minutes). It should be noted that the weather data and/or energy data may be observed any number of times during the day at any suitable frequency, depending on the particular embodiment. For example, if energy consumption is observed every 15 minutes, then the day may be broken up into 96 total time periods. In some implementations, weather observations are made about once every hour. Weather observations may include any number of records, such as dry bulb temperature (DB), wet bulb temperature (WB), humidity, barometric pressure, cloud cover, visibility, solar radiation, etc. In the example illustrated in FIG. 9, weather and/or energy observations are made at a time stamp $TS_j$, where the previous time stamp is $TS_{j-1}$.

In the short-term model, energy consumption values are measured with greater resolution than the readings from the monthly billing information. Therefore, the systems used herein may be configured to obtain energy consumption information directly from monitoring equipment associated with the asset, such as one or more computers capable of monitoring energy usage, one or more intelligent electronic devices (IEDs), automation systems, or other energy measuring devices. The interface device 20 (FIG. 1) may be configured to continually download energy data from the asset's energy monitoring systems.

Figure 10:
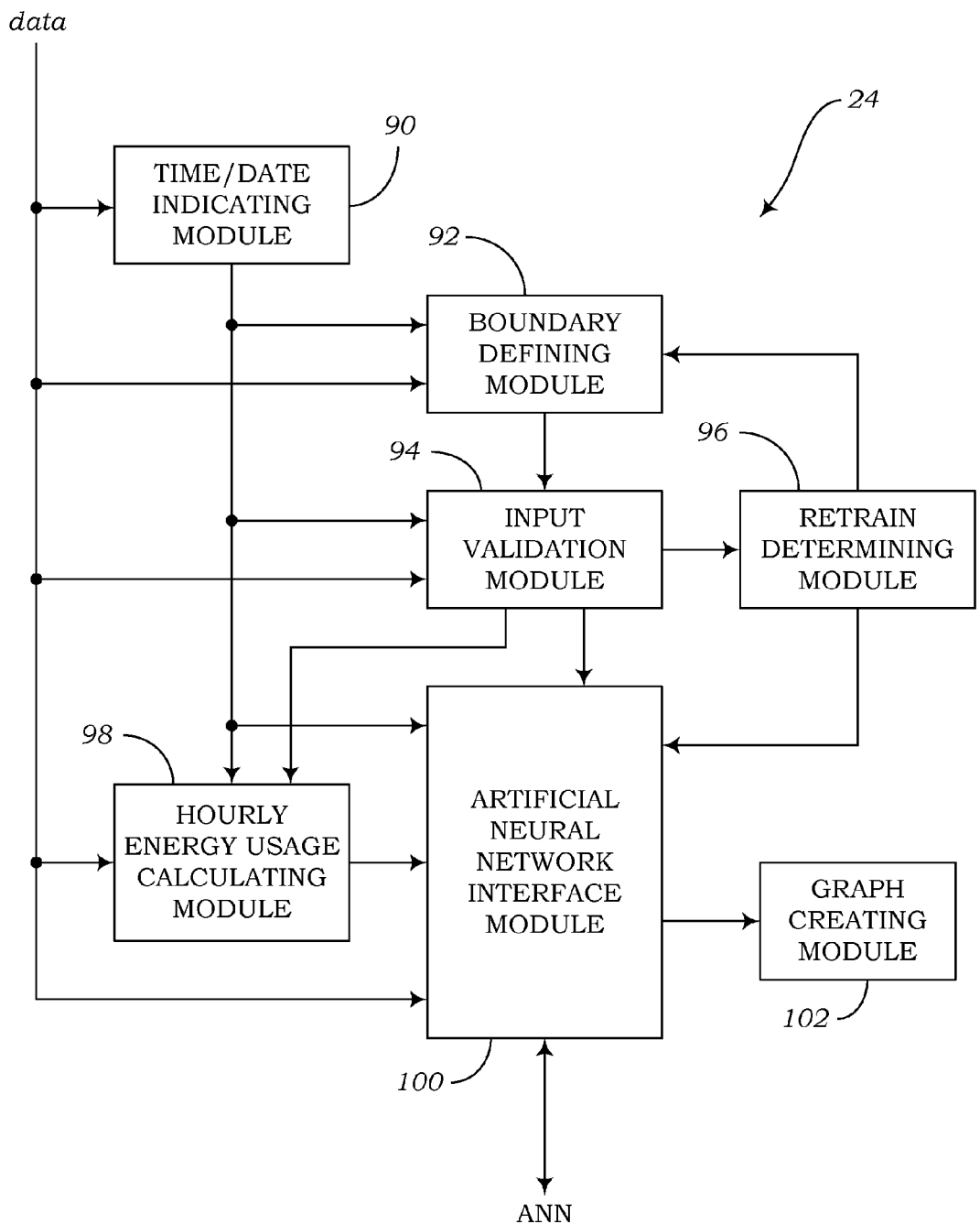
FIG. 10 is a block diagram illustrating a second embodiment of the energy use prediction program shown in FIG. 1, according to various implementations of the present disclosure.

FIG. 10 is a block diagram illustrating a second embodiment of the energy use prediction program 24 shown in FIG. 1. The energy use prediction program 24 in this embodiment is configured to provide predictions of energy use on a short-term basis (e.g., daily). In some implementations, the aspects of long-term energy use prediction (e.g., FIG. 3) and short-term energy use prediction (e.g., FIG. 10) may be combined into one software package for providing both types of prediction models. In other implementations, the long-term energy use prediction functionality may be provided separately from the short-term energy use prediction functionality.

As illustrated in FIG. 10, the energy use prediction program 24 includes a time/date indicating module 90, a boundary defining module 92, an input validation module 94, a retrain determining module 96, an hourly energy usage calculating module 98, an artificial neural network (ANN) interface module 100, and a graph creating module 102. The energy use prediction program 24 of FIG. 10 is configured to receive data relating to weather conditions and energy usage. Also, the time/date indication module 90 is configured to supply an indication, or time stamp, to some of the modules of the energy use prediction program 24 as needed. For example, the time/date indicating module 90 may provide at least time of day information and day of the week information.

Data obtained during a baseline time period, which may range from about three days to about three weeks, is processed for the purpose of training an ANN. During the baseline time period, the ANN is trained with inputs of time of the day, day of the week, dry-bulb temperature, wet-bulb temperature, and solar radiation. In some embodiments, the solar radiation may be calculated from the amount of cloud cover and the angle of the sun, which may be determined from time of day information and latitude and longitude information. The ANN is also trained with output values representing energy consumption. Once trained, the ANN may then be able to predict the energy consumption based on inputs of the time and weather data.

The boundary defining module 92 is configured to receive data regarding the weather and energy and create a boundary that defines a set of input points that are considered to be within the scope of operability of the ANN to properly predict an output. For instance, if the ANN is asked to predict a result based on inputs that are outside a range of which it has not been trained, then the outputs may not necessarily be reliable. In order to describe the functionality of the boundary defining module 92, reference is now made to FIGS. 11A-11E.

FIGS. 11A-11E are diagrams showing an example of input data points for the purpose of explaining implementations of methods for determining data point boundaries, which is a function of the boundary defining module 92. As a result, it may be determined if input data points might be properly utilized by an ANN that is already trained. Operating the trained ANN using inputs that are outside of the coverage of the baseline training data may lead to an extrapolation situation that produces inaccurate results. It is desirable that the boundary defining module 92 be able to detect this situation automatically and trigger a retrain of the ANN model if necessary.

One way to conceptualize the problem of inaccurate outputs resulting from extrapolation in three dimensions is to plot all the data points used for training the ANN on the same set of axes. The result is a point cloud in 3D space. The dots on the outside of the surface of the point cloud may be connected to form a boundary that separates the inside space of the ANN training data from the outside space, where the inside includes data that falls within a range of inputs entered into the ANN during training and the outside space includes new input data that have not been represented by the range of inputs. Although it may be acceptable in many situations to allow the ANN to predict outputs based on inputs slightly outside the boundary, the methods described with respect to FIG. 11 prevent the ANN from extrapolating predictions for inputs far outside the boundary.

As described with respect to FIG. 11, it is possible to determine a surface boundary of a training data point cloud in a computationally efficient way. The boundary defining module 92 may also be configured to create an ANN input space that has more than three dimensions, which complicates the conceptualization process. For example, because the ANN in this example is configured to process five inputs (i.e., time of day information, day of the week information, dry-bulb temperature, wet-bulb temperature, and solar radiation), the boundary defining module 92 may actually be configured to create a five-dimensional input space. For the purposes of illustration, however, the points are shown in the example of FIG. 11 in two dimensions, including two arbitrary inputs (e.g., dry-bulb temperature on one axis and time of day on the other axis).

Figure 11A:
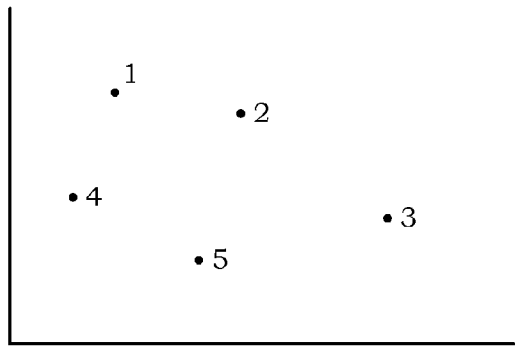
FIGS. 11A-11E are graphs showing a method of defining a boundary of input points, according to various implementations of the present disclosure.
Figure 11B:
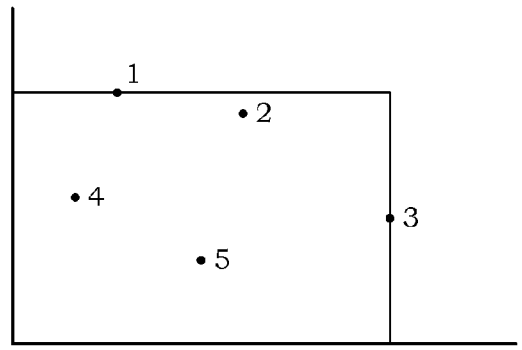
Figure 11C:
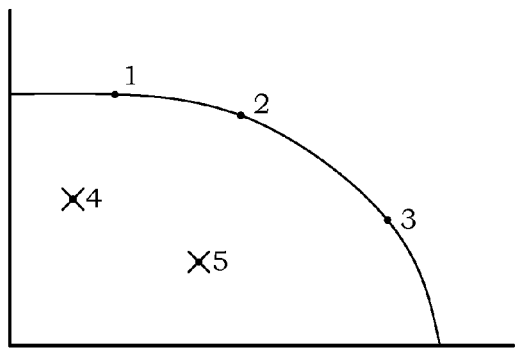

FIG. 11A is a graph showing an example of a single quadrant containing five hypothetical input points in a two-dimensional space. That is, these points represent five input data samples that are used to train an ANN with two inputs represented by the two axes. A first attempt to define the boundary of the ANN inputs may include using a "hypercube" (i.e., a cube in more than three dimensions), as shown in FIG. 11B. Constructing the hypercube may simply be a matter of determining the minimum and maximum values along each axis in the input space. However, this approach may prove to be too coarse. For example, if the ANN was trained with a first input of 35° F. at 3:00 am and a second input of 65° F. at 1:00 pm, then the ANN would theoretically be equipped, in this case, to offer a prediction for an input of 35° F. at 1:00 pm, which would actually require a large degree of extrapolation. A second attempt to define the boundary of the ANN inputs may involve calculating a "hyper-sphere," as shown in FIG. 11C. This approach may be used to enclose the training data, but it too may prove to allow too much extrapolation.

According to various embodiments of the present disclosure, an approach to the problem of defining the boundary of ANN inputs may include the use of aspects of multi-objective optimization (MOO). One technique used in the field of MOO is Pareto-optimality (or dominance) to compare potential solutions to an optimization problem. In the present disclosure, Pareto-optimality may be used to compare multi-dimensional vectors within an ANN to analyze a boundary of an input space. In MOO, the optimization objective function is a vector of values that cannot be combined into a single number. Because of this, a technique was developed beginning in the 1980s using the concept of Pareto-optimality to define the notion of dominance between two potentially optimal solutions. One solution is said to dominate another if it is at least equal in all ways and better in at least one way. Applying this technique to a pool of potential results allows all of the non-optimal solutions to be removed, leaving only the optimal, or non-dominated, results.

In the present disclosure, Pareto-optimality is not used for eliminating non-optimal solutions, but is used for eliminating interior solutions by subtracting the data from the mean in each axis and then processing each quadrant independently. The concept may then be used to eliminate ANN input points that do not contribute to the boundary of the surface separating the inside space from the outside space.

Figure 11D:
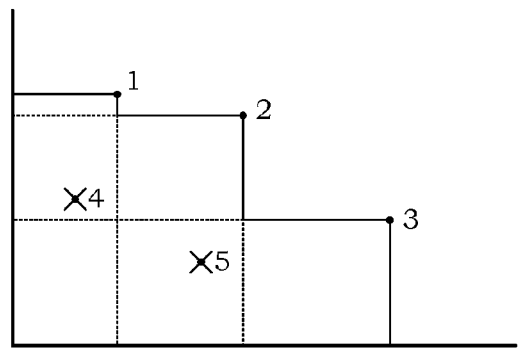

Although five points are available in this example, only three of these points are considered to actually contribute to an outer surface. To eliminate unnecessary data points, rectangles are drawn, as shown in FIG. 11D from both axes to each data point. The points (e.g., points 4 and 5) that are contained completely within the rectangle or rectangles of one or more other points are not needed to define the surface and may be eliminated from the set. The remaining points may then be stored as the representation of the boundary. For ANN models with a large number of input points, this technique may be used to substantially reduce the amount of data needed to characterize the boundary.

Figure 11E:
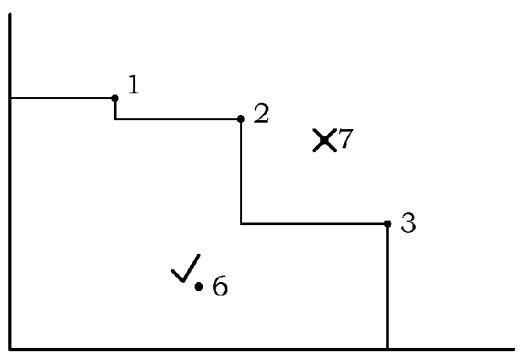

When new data is provided to the trained ANN for generating predictions, the systems may test the new data points using the saved boundary to determine if the points are within the boundary. As shown in FIG. 11E, the points 1, 2, and 3 defining the boundary are used to test new points 6 and 7. Since point 6 is inside the surface of the boundary, ANN predictions based on this data are considered to be valid. However, point 7 is outside of the boundary and predictions based on this data may be extrapolated inaccurately. Therefore, an output prediction for input point 7 would not normally be made in this case.

Referring again to FIG. 10, the boundary defining module 92 defines the boundary, as mentioned above, and is further configured to provide the boundary definition to the input validation module 94. This is performed with the data from the baseline time period and may also be performed when the ANN is also being trained. Once the input boundary has been defined and the ANN is trained, then the system is able to begin making predictions of energy usage based on future inputs. More particularly, predictions are made for those inputs that fall within the defined boundary.

The input validation module 94 receives the boundary definition from the boundary defining module 92 and also receives input data (e.g., time of day, day of week, dry-bulb temperature, wet-bulb temperature, and solar radiation). The input validation module determines if the input data (i.e., the new points) are within the boundary. The points that fall inside the boundary are considered to be valid and are forwarded to the hourly energy usage calculating module 98 for processing. Otherwise, the points determined to be outside the boundary are typically ignored in various embodiments of the present disclosure. Hence, the points are simply not used by the energy use prediction program 24 for detecting asset anomalies.

Unused points may also be sent to the retrain determining module 96. The retrain determining module 96 may ignore any point that does not fit with the prediction models. However, a large number of incoming data points that are outside the boundary may indicate that the existing model no longer accurately represents the typical operating conditions of the asset. The retrain determining module 96 may determine if the number of points outside the boundary reaches a predetermined percentage, then it may be time to retrain. If this is the case, the ANN may be retrained as needed with a more recent set of baseline data. Since the training covers a relatively short amount of time (e.g., one week), the weather condition may change dramatically over the course of several weeks, which thereby may require retraining. If the retrain determining module 96 determines that the ANN should be retrained with new data, a signal is sent to the ANN interface module 100 to instruct the ANN to train again with updated information. In addition, when retraining is needed, the retrain determining module 96 also signals the boundary defining module 92 to redefine the boundary for a new set of points. When the retraining and redefining processes are performed, the ANN and boundary defining module 92 may utilize unused points that are stored by the retrained determining module 96 or may begin retraining with new data. Furthermore, retraining may also be initiated manually. For example, retraining may be initiated if a large number of anomalies, which may be flagged by the ANN, are dismissed by the asset manager as "normal." Therefore, instead of detecting anomalies, the purported errors may actual be an indication that the asset operating conditions have changed. In this case, an operator of the energy use prediction program 24 may trigger a retrain in which new input boundaries are defined and the ANN is retrained.

Energy consumption information (measured in KWHs) is provided to the hourly energy usage calculating module 98. Energy consumption results are sent to the ANN interface module 100. The hourly energy usage calculating module 98 calculates the amount of energy consumed per hour based on the received energy consumption information and the time between energy readings. The calculated hourly energy usage is provided to the ANN interface module 100. Weather information is provided directly to the ANN interface module 100.

The ANN interface module 100 receives the hourly energy usage information, the time information, and the weather information. In turn, the ANN interface module 100 may forward this information to an ANN (e.g., the ANN program 26 shown in FIG. 1) for training purposes. According to various implementations, the ANN interface module 100 supplies the day of week, hour of the day, outdoor dry-bulb temperature, outdoor wet-bulb temperature, and solar radiation as input information. Also, the ANN interface module 100 supplies the hourly energy usage as output information. One factor to consider when supplying information to the ANN for training is the amount of information that the ANN needs to make an accurate approximation. Using too much data may result in false correlations and may include events when the asset operation has temporarily changed. On the other hand, if too little data is used, false anomalies may be detected because of a lack of coverage in the training data.

Figure 12:
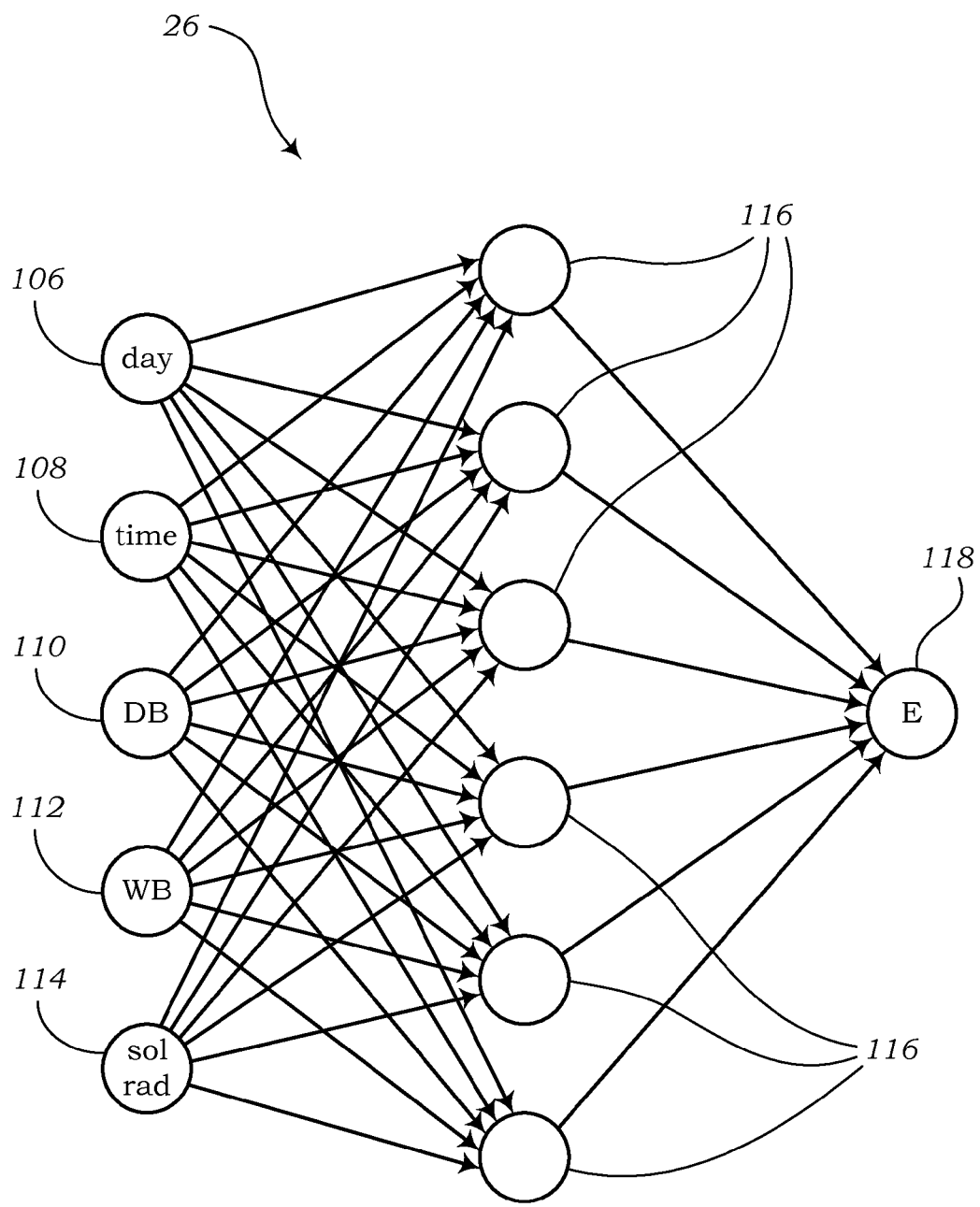
FIG. 12 is a diagram illustrating a second embodiment of the ANN program shown in FIG. 1, according to various implementations of the present disclosure.

FIG. 12 is a diagram of a second embodiment of the ANN program 26 shown in FIG. 1 for short-term energy prediction modeling. In this example, the ANN program 26 is configured to receive a day input 106 (e.g., day of the week), a time input 108 (e.g., time of day), a dry-bulb temperature input 110 (DB), a wet-bulb temperature input 112 (WB), and a solar radiation input 114. The ANN program 26 includes middle nodes 116 that may involve various algorithms, functions, mathematical equations, exponential equations, logarithms, etc. The ANN program 26 is configured as an approximator to form the middle nodes 116 as needed to take the inputs 106, 108, 110, 112, and 114 and provide an accurate approximation of an energy output 118, which represents the hourly energy usage.

Referring again to FIG. 10, the ANN interface module 100 may be configured to operate with the ANN program 26 for sharing training information. Once trained, the ANN program 26 is configured to receive input information relating to time and weather and predict an accurate energy demand based on the inputs. The energy demand results may be supplied to the graph creating module 102 to graphically display the predicted energy usage along with actual energy usage.

Figure 13:
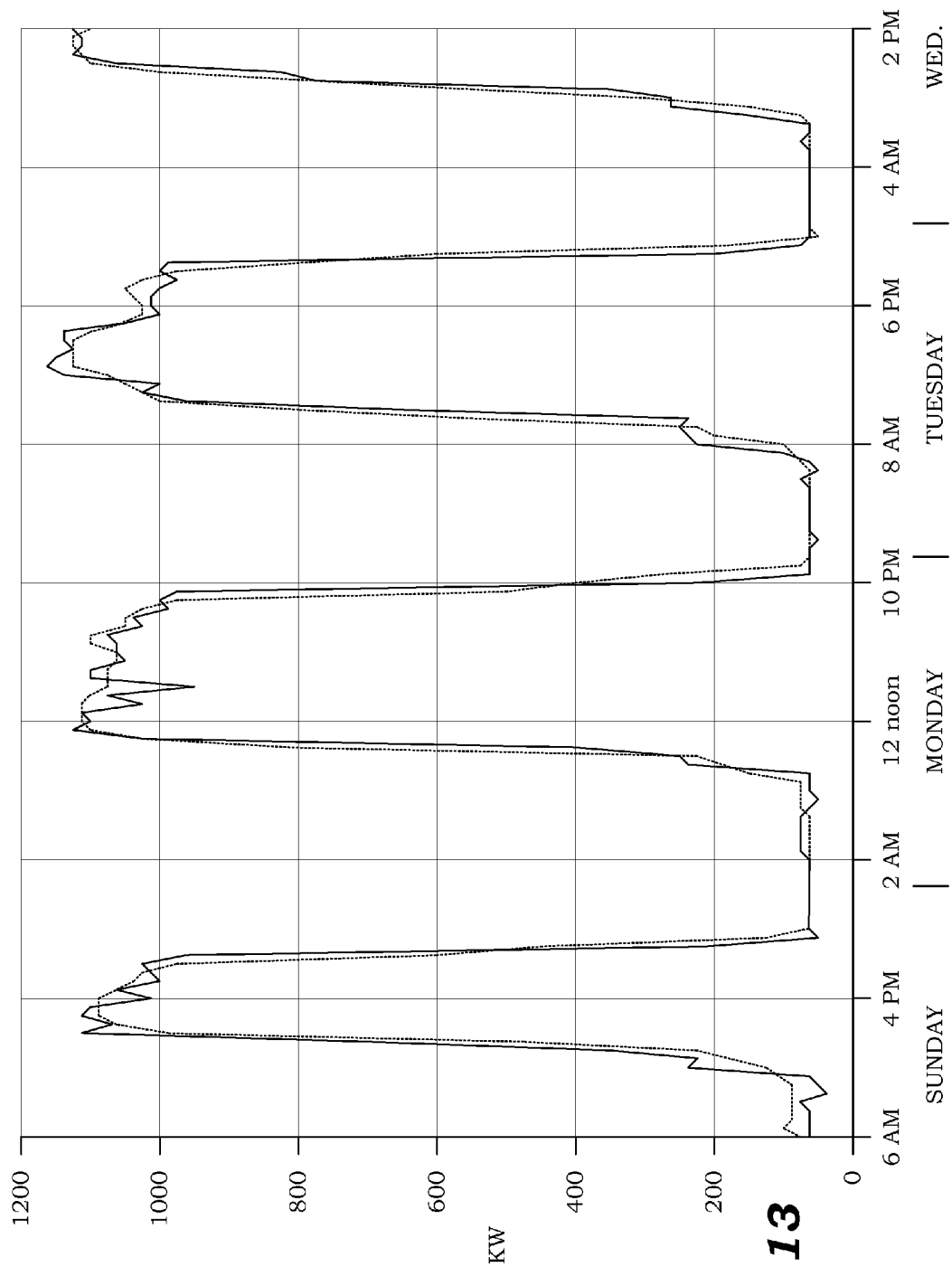
FIG. 13 is a graph showing predicted and actual energy usage of an exemplary asset (e.g., building) during a short-term baseline period, according to various implementations of the present disclosure.

FIG. 13 is a graph showing an example of actual energy consumption (solid line) and predicted energy consumption (dashed line) of an asset for a baseline time period covering about half of a week. The ANN is able to accurately track the energy usage and is even able to handle varying daily schedules, as evidenced by the tracking of the shorter operating hours for the first day shown (i.e., Sunday).

Figure 14:
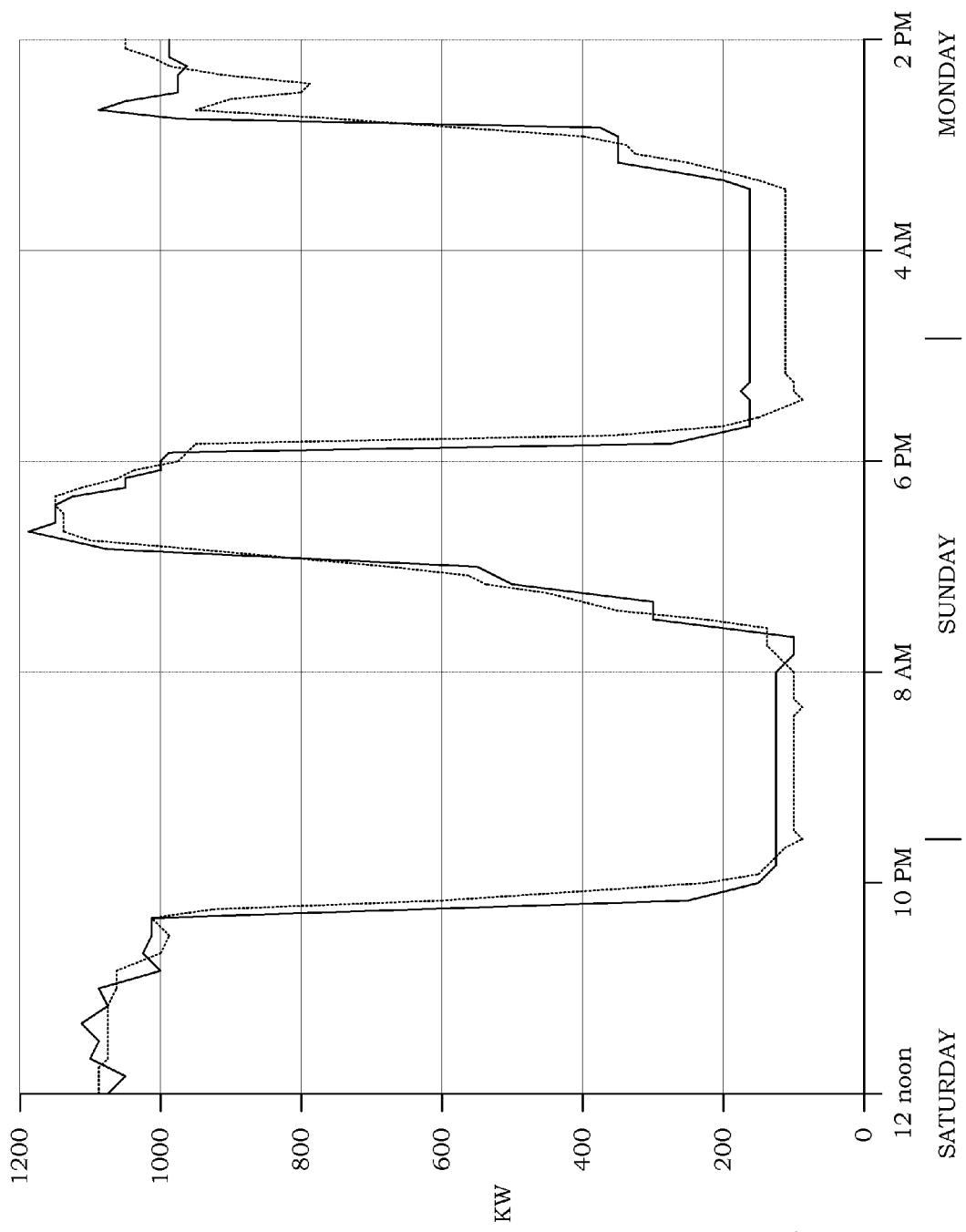
FIG. 14 is a graph showing predicted and actual energy usage of the exemplary asset during a prediction period, according to various implementations of the present disclosure.

FIG. 14 is a graph showing an example of actual energy consumption (solid line) and predicted energy consumption (dashed line) of the asset during a prediction period, which follows after the baseline training period discussed with respect to FIG. 13. The graph in this example shows the accuracy of the prediction. However, the short-term prediction model is also able to detect anomalies in energy usage, which may be seen during the overnight hours. The two plots show a disparity between the predicted energy consumption level and the actual energy consumption level, where the overnight power consumption is higher than normal or expected. This disparity may be determined electronically by the energy use prediction program 24 or may be observed by viewing the graph produced by the graph creating module 96.

Either way, the offset may be a factor that should be reported to a manager or other administrator of the asset. Upon investigation, the offset may be a function of a valid change in the asset operation, such as the installation of an illuminated outdoor sign that operates overnight, machinery being left on during the night, or other changes in the normal operation of the asset. The offset may also be a factor of unforeseen situations (e.g., defective equipment) that may require further investigation by the asset manager. Any new changes to the normal operation may be picked up during the prediction period of FIG. 14 and may be used for retraining the ANN for future predictions.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

We claim:

1. A computer-implemented method comprising:
   selecting, by a processing device, one of a plurality of base temperatures that allows a linear equation to estimate energy consumption by an asset as a function of an average daily demand on the asset to attain a desired temperature;
   inserting, by the processing device, the selected base temperature in a non-linear equation for modeling the asset's energy consumption;
   receiving, by the processing device, a plurality of weather measurements indicating weather conditions of a region in which the asset is located, wherein the plurality of weather measurements are obtained during a baseline time period;
   receiving, by the processing device, a plurality of energy consumption measurements indicating amounts of energy consumed by the asset, wherein the energy consumption measurements are obtained during the baseline time period;
   calculating, by the processing device, the average daily demand to attain a predetermined range of temperatures, wherein the average daily demand represents an energy demand on the asset, wherein the average daily demand is calculated for each of a plurality of billing periods in the baseline time period, and wherein the desired temperature is within the predetermined range of temperatures;

utilizing, by the processing device, a plurality of linear equations representing estimations of energy consumption as a function of the average daily demand for each respective billing period, wherein each linear equation corresponds to a respective one of the plurality of base temperatures, the base temperatures representing outdoor temperatures at which the asset is not needed to attain the predetermined range of temperatures; and evaluating, by the processing device, each of the linear equations based in part on how well the linear equation estimates actual energy consumption;

wherein the linear equation to estimate energy consumption by the asset is one of the plurality of linear equations;

wherein the selected base temperature corresponds to the linear equation that best estimates the actual energy consumption;

wherein creating the plurality of linear equations uses the following formula:

$$KWHLIN_k(H_i, C_i) = A1_k + (A2_k * H_i) + (A3_k * C_i)$$

and uses a least-squares analysis to determine A1, A2, and A3, where A1 is a coefficient representing a factor of energy usage that is not associated with heating and cooling, A2 is a coefficient representing a factor of energy usage associated with the heating demand, and A3 is a coefficient representing a factor of energy usage associated with the cooling demand; and wherein A2 is also a factor of a volume of space to be heated and the efficiency of the heating system, and wherein A3 is a factor of the volume of space to be cooled and the efficiency of the cooling system.

2. The computer-implemented method of claim 1, further comprising:

receiving a plurality of weather measurements indicating weather conditions of a region in which the asset is located, wherein the plurality of weather measurements are obtained during a baseline time period; and receiving a plurality of energy consumption measurements indicating amounts of energy consumed by the asset, wherein the energy consumption measurements are obtained during the baseline time period;

wherein the average daily demand is calculated for each of a plurality of billing periods in the baseline time period.

3. The computer-implemented method of claim 1, wherein each of the plurality of base temperatures includes a heating base temperature and a cooling base temperature, wherein the heating base temperature represents an outdoor temperature at or above which heating by the asset is not needed to attain a first desired indoor temperature, and wherein the cooling base temperature represents an outdoor temperature at or below which cooling by the asset is not needed to attain a second desired indoor temperature, and wherein, for each pair of values of the heating base temperature and cooling base temperature, the computer-implemented method further comprises:

calculating an average daily heating demand and an average daily cooling demand for each of the plurality of billing periods in the baseline time period; and creating the linear equations representing the estimations of energy consumption as a function of the average daily heating demand and average daily cooling demand for each respective billing period.

4. The computer-implemented method of claim 1, further comprising training an artificial neural network (ANN) by providing the ANN with an input related to the average daily demand using the selected base temperature and an output related to an average daily amount of energy consumption.

5. The computer-implemented method of claim 1, wherein the base temperatures include heating base temperatures and cooling base temperatures, each heating base temperature representing an outdoor temperature at or above which heating by an HVAC system of the asset is not needed to attain a first desired indoor temperature, and each cooling base temperature representing an outdoor temperature at or below which cooling by the HVAC system is not needed to attain a second desired indoor temperature, and wherein, for each pair of values of the heating base temperature and cooling base temperature, the method further comprises:

calculating an average daily heating demand and an average daily cooling demand for each of the plurality of billing periods in the baseline time period; and creating the linear equations representing the estimations of energy consumption as a function of the average daily heating demand and average daily cooling demand for each respective billing period.

6. The computer-implemented method of claim 1, further comprising:

training an artificial neural network (ANN) by providing the ANN with one or more inputs and an output for each billing period, each input related to the average daily demand using the selected base temperature for a respective billing period, and each output related to an average daily amount of energy consumption;

wherein the ANN comprises at least one non-linear function.

7. The computer-implemented method of claim 6, further comprising:

predicting energy consumption of the asset based on outdoor temperatures during a prediction period following the baseline time period;

calculating an offset between the predicted energy consumption and actual energy consumption for a billing period of the prediction period; and communicating with a manager of the asset when the offset between the predicted energy consumption and the actual energy consumption exceeds a predetermined threshold.

8. The computer-implemented method of claim 1, wherein the baseline time period is approximately one year and each billing period is approximately one month;

wherein receiving the plurality of weather measurements further comprises receiving the weather measurements from a weather service about once every hour during the baseline time period;

wherein receiving energy consumption measurements further comprises receiving energy consumption data from an energy bill provided by an energy company; and wherein the asset is a building.

9. The computer-implemented method of claim 1, wherein evaluating the linear equation involves calculating a coefficient of determination $R^2$ using the following equation:

$$R^2 = 1 - \frac{\sum (e - \bar{e})^2}{\sum (y - \bar{y})^2}$$

where $e=KWH_i-KWHLIN_{k,i}*(1+BE_i-BS_i)$, $\bar{e}$=average of all "e"s, $y=KWH_i$, and $\bar{y}$=average of all "y"s. $\forall i \in [BLS, BLE]$
wherein selecting one of base temperatures comprises selecting a heating base temperature and a cooling base temperature and further comprises selecting the heating base temperature and cooling base temperature corresponding to the linear equation having the highest $R^2$ value.

10. A system comprising:
a processing device configured to control the operations of the system;
an interface device configured to receive a plurality of outdoor temperature measurements of a region in which an asset is located and a plurality of energy consumption measurements of the asset, wherein the plurality of outdoor temperature measurements and energy consumption measurements are taken during a baseline time period;
an energy use prediction program in communication with the processing device, the energy use prediction program configured to enable the processing device to process a pair of values of a heating base temperature and a cooling base temperature, the energy use prediction program comprising an average daily heating demand calculating module, an average daily cooling demand calculating module, a linear equation fitting module, and a linear equation evaluation module;
wherein the energy use prediction program is further configured to enable the processing device to:
receive a plurality of weather measurements indicating weather conditions of a region in which the asset is located, wherein the plurality of weather measurements are obtained during a baseline time period;
receive a plurality of energy consumption measurements indicating amounts of energy consumed by the asset, wherein the energy consumption measurements are obtained during the baseline time period;
calculate the average daily demand to attain a predetermined range of temperatures, wherein the average daily demand represents an energy demand on the asset, wherein the average daily demand is calculated for each of a plurality of billing periods in the baseline time period, and wherein the desired temperature is within the predetermined range of temperatures;
utilize a plurality of linear equations representing estimations of energy consumption as a function of the average daily demand for each respective billing period, wherein each linear equation corresponds to a respective one of the plurality of base temperatures, the base temperatures representing outdoor temperatures at which the asset is not needed to attain the predetermined range of temperatures; and
evaluate each of the linear equations based in part on how well the linear equation estimates actual energy consumption;
wherein the linear equation to estimate energy consumption by the asset is one of the plurality of linear equations;
wherein the selected base temperature corresponds to the linear equation that best estimates the actual energy consumption;
wherein the plurality of linear equations comprise the following formula:

$KWHLIN_k(H_i, C_i) = A1_k + (A2_k * H_i) + (A3_k * C_i)$ and use a least-squares analysis to determine A1, A2, and A3, where A1 is a coefficient representing a factor of energy usage that is not associated with heating and cooling, A2 is a coefficient representing a factor of energy usage associated with the heating demand, and A3 is a coefficient representing a factor of energy usage associated with the cooling demand; and
wherein A2 is also a factor of a volume of space to be heated and the efficiency of the heating system, and wherein A3 is a factor of the volume of space to be cooled and the efficiency of the cooling system.

11. The system of claim 10, wherein the energy use prediction program is further configured to enable the processing device to process each pair of values of a heating base temperature and a cooling base temperature from a plurality of values of heating base temperatures and cooling base temperatures.

12. The system of claim 11, wherein, for each pair of values, the energy use prediction program is configured to enable the processing device to:
calculate an average daily heating demand using the average daily heating demand calculating module and an average daily cooling demand using the average daily cooling demand calculating module for each of a plurality of billing periods in the baseline time period;
create a linear equation using the linear equation fitting module, the linear equation representing an estimation of energy consumption as a function of the average daily heating demand and average daily cooling demand for each respective billing period;
evaluate the linear equation using the linear equation evaluation module based in part on how well the linear equation estimates actual energy consumption; and
select the pair of values of the heating base temperature and cooling base temperature corresponding to the linear equation that provides a desirable evaluation for estimating actual energy consumption.

13. The system of claim 12, wherein the energy use prediction program further comprises an artificial neural network (ANN) interface module configured to train an ANN by providing the ANN with first and second inputs and an output for each billing period, each first input related to the average daily heating demand using the selected heating base temperature for a respective billing period, each second input related to the average daily cooling demand using the selected cooling base temperature for the respective billing period, and each output related to an average daily amount of energy consumption;
wherein the energy use prediction program is further configured to predict energy consumption of an HVAC system based on outdoor temperatures during a prediction period following the baseline time period, and wherein the asset is a building and the HVAC system is incorporated in the building; and
wherein the energy use prediction program further comprises a graph creating module configured to create a graph showing predicted energy consumption and actual energy consumption to allow an observation of an offset between the predicted energy consumption and actual energy consumption for one or more billing periods of the prediction period.

14. The system of claim 10, wherein:
the average daily heating demand calculating module and the average daily cooling demand calculating module use the following equations:

$$H_i = \frac{\sum_j \max(HB - DB_j, 0) * (DBTS_j - DBTS_{j-1})}{BE_i - BS_i + 1}$$

$$C_i = \frac{\sum_j \max(DB_j - CB, 0) * (DBTS_j - DBTS_{j-1})}{BE_i - BS_i + 1}$$

$$\forall j : BS_i \leq DBTS_j \leq BE_i$$

where HB is the heating base temperature, $DB_j$ is a dry bulb temperature measurement at a timestamp j, $DBTS_j$ and $DBTS_{j-1}$ are current and prior timestamps j and j−1, $BS_i$ is a start date for billing period i, and $BE_i$ is an end date for billing period i, and CB is the cooling base temperature, wherein the average daily heating demand and average daily cooling demand are calculated in units of degree-days;
the linear equation fitting module uses the following formula:

$$KWHLIN_k(H_i, C_i) = A1_k + (A2_k * H_i) + (A3_k * C_i)$$

and uses a least-squares analysis to determine A1, A2, and A3, where A1 is a coefficient representing a factor of energy usage that is not associated with heating and cooling, A2 is a coefficient representing a factor of energy usage associated with the heating demand, and A3 is a coefficient representing a factor of energy usage associated with the cooling demand; and
the linear equation evaluation module is configured to calculate a coefficient of determination $R^2$ using the following equation:

$$R^2 = 1 - \frac{\sum (e - \bar{e})^2}{\sum (y - \bar{y})^2}$$

where $e = KWH_i - KWHLIN_{k,i} * (1 + BE_i - BS_i)$, $\bar{e}$=average of all "e"s, $y = KWH_i$, and $\bar{y}$=average of all "y"s $\forall i \in [BLS, BLE]$.

15. A computer-readable medium configured to store non-transitory instructions for predicting energy consumption, the instructions comprising:
logic adapted to receive a plurality of weather measurements of outdoor weather conditions of a region in which an asset is located, wherein the plurality of weather measurements are taken during a baseline time period, and to receive energy consumption measurements of energy consumed by the asset, wherein the energy consumption measurements are taken during the baseline time period;
logic adapted to calculate, for a first pair of values of a heating base temperature and a cooling base temperature, an average daily heating demand and an average daily cooling demand for each of a plurality of billing periods in the baseline time period;
logic adapted to create, for the first pair of values, a linear equation representing an estimation of energy consumption as a function of the average daily heating demand and average daily cooling demand for each respective billing period;
logic adapted to evaluate, for the first pair of values, the linear equation based in part on how well the linear equation estimates actual energy consumption
logic adapted to receive a plurality of weather measurements indicating weather conditions of a region in which the asset is located, wherein the plurality of weather measurements are obtained during a baseline time period;
logic adapted to receive a plurality of energy consumption measurements indicating amounts of energy consumed by the asset, wherein the energy consumption measurements are obtained during the baseline time period;
logic adapted to calculate the average daily demand to attain a predetermined range of temperatures, wherein the average daily demand represents an energy demand on the asset, wherein the average daily demand is calculated for each of a plurality of billing periods in the baseline time period, and wherein the desired temperature is within the predetermined range of temperatures;
logic adapted to utilize a plurality of linear equations representing estimations of energy consumption as a function of the average daily demand for each respective billing period, wherein each linear equation corresponds to a respective one of the plurality of base temperatures, the base temperatures representing outdoor temperatures at which the asset is not needed to attain the predetermined range of temperatures; and
logic adapted to evaluate each of the linear equations based in part on how well the linear equation estimates actual energy consumption;
wherein the linear equation to estimate energy consumption by the asset is one of the plurality of linear equations;
wherein the selected base temperature corresponds to the linear equation that best estimates the actual energy consumption;
wherein the plurality of linear equations comprise the following formula:

$$KWHLIN_k(H_i, C_i) = A1_k + (A2_k * H_i) + (A3_k * C_i)$$

and use a least-squares analysis to determine A1, A2, and A3, where A1 is a coefficient representing a factor of energy usage that is not associated with heating and cooling, A2 is a coefficient representing a factor of energy usage associated with the heating demand, and A3 is a coefficient representing a factor of energy usage associated with the cooling demand; and
wherein A2 is also a factor of a volume of space to be heated and the efficiency of the heating system, and wherein A3 is a factor of the volume of space to be cooled and the efficiency of the cooling system.

16. The computer-readable medium of claim 15, further comprising:
logic adapted to process each pair of values of a heating base temperature and a cooling base temperature from a plurality of values of heating base temperatures and cooling base temperatures, wherein the logic adapted to calculate the average daily heating demand and average daily cooling demand is further adapted to calculate average daily heating demand and average daily cooling demand for each pair of values, wherein the logic adapted to create the linear equation is further adapted to create a linear equation for each pair of values, and wherein the logic adapted to evaluate the linear equation is further adapted to evaluate the linear equation for each pair of values; and logic adapted to select the pair of values of the heating base temperature and cooling base temperature corresponding to the linear equation that optimally estimates actual energy consumption;

wherein the instructions further comprise logic adapted to train an artificial neural network (ANN) by providing the ANN with first and second inputs and an output for each billing period, each first input related to the average daily heating demand using the selected heating base temperature for a respective billing period, each second input related to the average daily cooling demand using the selected cooling base temperature for the respective billing period, and each output related to an average daily amount of energy consumption.

17. The computer-readable medium of claim 15, wherein the instructions further comprise:

logic adapted to predict energy consumption of an HVAC system based on outdoor temperatures during a prediction period following the baseline time period, wherein the asset is a building and the HVAC system is incorporated in the building; and logic adapted to calculate an offset between the predicted energy consumption and actual energy consumption for one or more billing periods of the prediction period.

18. The computer-readable medium of claim 15, wherein the baseline time period is approximately one year and each billing period is approximately one month, and wherein the logic adapted to receive the plurality of weather measurements further comprises receiving the weather measurements from a weather service about once every hour during the baseline time period; and wherein the heating base temperature represents an outdoor temperature at or above which heating by an HVAC system of the asset is not needed to attain a first desired indoor temperature, and wherein the cooling base temperature represents an outdoor temperature at or below which cooling by the HVAC system is not needed to attain a second desired indoor temperature.

* * * * *